United States Patent
Hiramoto et al.

(10) Patent No.: US 9,641,446 B2
(45) Date of Patent: May 2, 2017

(54) CONTROL METHOD, INFORMATION PROCESSING SYSTEM, AND INFORMATION PROCESSING APPARATUS

(71) Applicant: FUJITSU LIMITED, Kawasaki-shi, Kanagawa (JP)

(72) Inventors: Shinya Hiramoto, Yokohama (JP); Tomohiro Inoue, Kawaski (JP); Masahiro Maeda, Zama (JP); Shun Ando, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 94 days.

(21) Appl. No.: 14/608,389

(22) Filed: Jan. 29, 2015

(65) Prior Publication Data

US 2015/0256468 A1  Sep. 10, 2015

(30) Foreign Application Priority Data

Mar. 6, 2014  (JP) .................................. 2014-043746

(51) Int. Cl.
| | | |
|---|---|---|
| H04J 3/26 | (2006.01) | |
| H04L 12/841 | (2013.01) | |
| H04L 12/825 | (2013.01) | |
| H04L 12/801 | (2013.01) | |

(52) U.S. Cl.
CPC .............. *H04L 47/28* (2013.01); *H04L 47/11* (2013.01); *H04L 47/12* (2013.01); *H04L 47/25* (2013.01)

(58) Field of Classification Search
CPC ......... H04L 47/28; H04L 47/11; H04L 47/12; H04L 47/25
See application file for complete search history.

(56) References Cited

U.S. PATENT DOCUMENTS

| | | | | |
|---|---|---|---|---|
| 5,090,011 A | * | 2/1992 | Fukuta | ................ H04L 12/5602 370/230 |
| 5,426,640 A | * | 6/1995 | Hluchyj | .............. H04L 12/5602 370/235 |
| 5,864,539 A | * | 1/1999 | Yin | ..................... H04L 12/5601 370/236 |

(Continued)

FOREIGN PATENT DOCUMENTS

| | | |
|---|---|---|
| JP | 63-24742 | 2/1988 |
| JP | 2-170646 | 7/1990 |
| JP | 9-149077 | 6/1997 |

*Primary Examiner* — Phuc Tran
(74) *Attorney, Agent, or Firm* — Staas & Halsey LLP

(57) ABSTRACT

A control method by an information processing system including a plurality of computers and a plurality of switch devices, the control method includes storing, by a first processor, degeneration information indicating a path in which a transmission rate is decreased and a decreasing ratio of a transmission rate in a first memory when a first switch device which include the first processor detects the path and the first switch device is set as a point of origin; determining, by a second processor, whether a plurality of packets pass through the path, based on the degeneration information when the plurality of packets are transmitted from a computer including the second processor; determining a length of a gap based on the decreasing ratio when it is determined that the plurality of packets pass through the path; and transmitting the plurality of packets with a transmission interval based on the length.

14 Claims, 29 Drawing Sheets

(56) References Cited

U.S. PATENT DOCUMENTS

| | | | |
|---|---|---|---|
| 6,333,917 B1 * | 12/2001 | Lyon | H04L 12/5602 370/236 |
| 7,525,913 B2 * | 4/2009 | Thibodeau | H04L 12/5601 370/231 |
| 2006/0088032 A1 * | 4/2006 | Venables | H04L 47/10 370/395.4 |

* cited by examiner

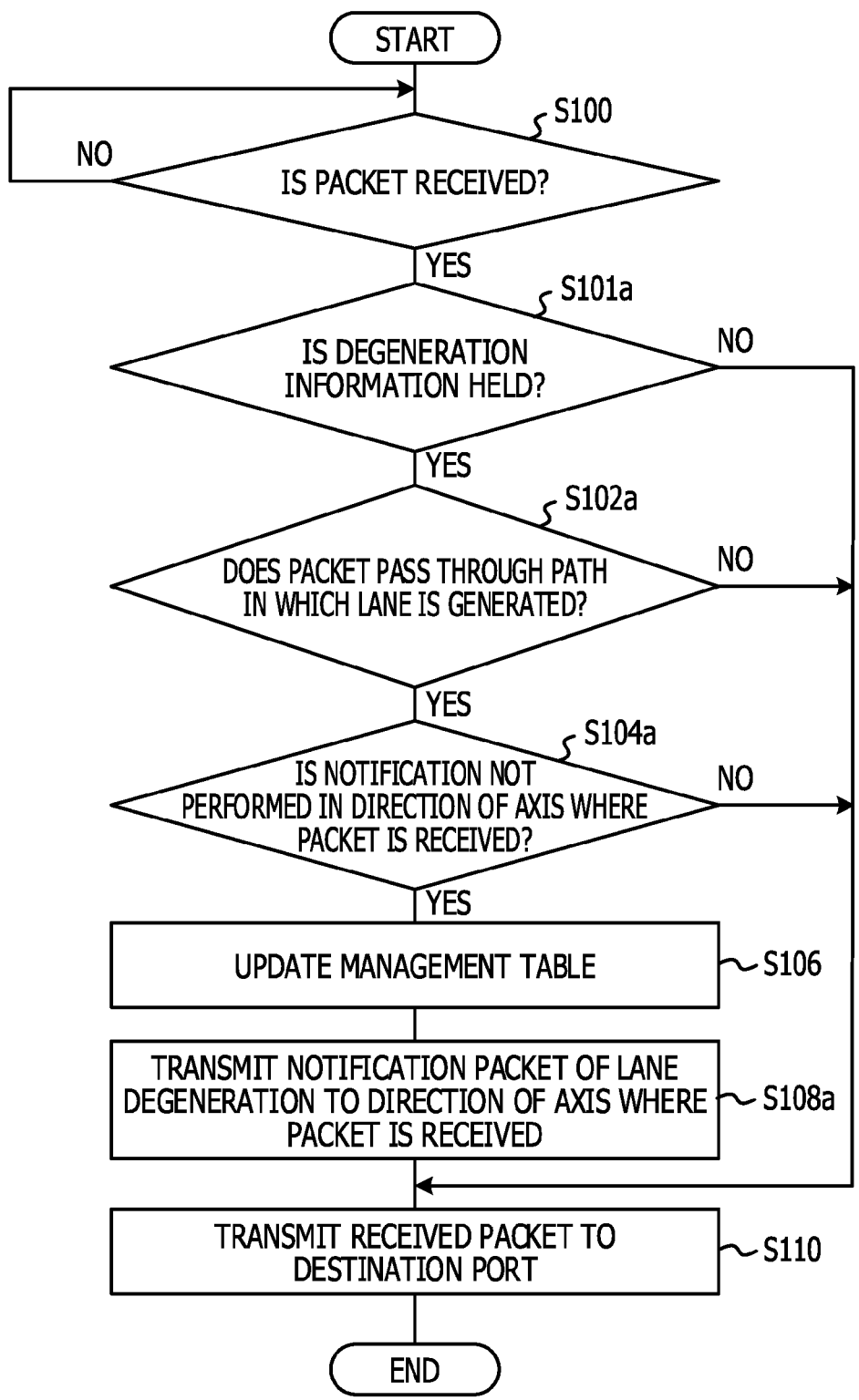

FIG. 29

MANAGEMENT TABLE OF SW(2,2)

| LANE DEGENERATION RATIO | DEGENERATION POSITION ADDRESS | DEGENERATION POSITION AXIS | NOTIFICATION AXIS |
|---|---|---|---|
| 1/2 | X1=2,X2=2 | X2+ | X2- |
| ... | ... | ... | ... |

MANAGEMENT TABLE OF SW(2,1)

| PACKET TYPE | DEGENERATION POSITION ADDRESS | DEGENERATION POSITION AXIS | NOTIFICATION AXIS |
|---|---|---|---|
| 1/2 | X1=2,X2=2 | X2+ | X2- |
| 1/2 | X1=2,X2=2 | X2+ | X1- |
| ... | ... | ... | ... |

MANAGEMENT TABLE OF SW(2,0)

| PACKET TYPE | DEGENERATION POSITION ADDRESS | DEGENERATION POSITION AXIS | NOTIFICATION AXIS |
|---|---|---|---|
| 1/2 | X1=2,X2=2 | X2+ | X2- |
| ... | ... | ... | ... |

MANAGEMENT TABLE OF SW(1,1) AND SW(0,1)

| PACKET TYPE | DEGENERATION POSITION ADDRESS | DEGENERATION POSITION AXIS | NOTIFICATION AXIS |
|---|---|---|---|
| 1/2 | X1=2,X2=2 | X2+ | X1- |
| ... | ... | ... | ... |

CONTROL METHOD, INFORMATION PROCESSING SYSTEM, AND INFORMATION PROCESSING APPARATUS

CROSS-REFERENCE TO RELATED APPLICATION

This application is based upon and claims the benefit of priority of the prior Japanese Patent Application No. 2014-043746, filed on Mar. 6, 2014, the entire contents of which are incorporated herein by reference.

FIELD

The embodiments discussed herein are related to a control method, an information processing system, and an information processing apparatus.

BACKGROUND

A technique has been proposed in which when a utilization factor of a buffer provided in a relay node between a transmitting device and a receiving device reaches a predetermined value, congestion that occurred in a communication path is solved by decreasing a packet amount transmitted to the receiving device from the transmitting device (for example, refer to Japanese Laid-open Patent Publication No. 9-149077).

A technique has been proposed in which when congestion occurs in a communication path between a transmitting terminal and a receiving terminal, the transmitting terminal is notified of information indicating the congestion and thus, the notified transmitting terminal suppresses the transmission of the packet, thereby solving the congestion (for example, refer to Japanese Laid-open Patent Publication No. 63-024742 and Japanese Laid-open Patent Publication No. 2-170646).

However, since the above described technique is for solving the congestion by detecting the congestion that occurred in the communication path, it is difficult to suppress occurrence of the congestion. For example, in an information processing system such as a parallel computer system in which a plurality of the information processing apparatuses which are coupled to each other via switch devices, the congestion that occurred in one spot widely spreads in a chain reaction. It is preferable to suppress occurrence of the congestion, but a technique for suppressing the occurrence of the congestion has not been proposed.

SUMMARY

According to an aspect of the invention, a control method by an information processing system including a plurality of computers and a plurality of switch devices which connect the plurality of computers to each other, the control method includes storing, by a first processor, degeneration information indicating a path in which a transmission rate is decreased and a decreasing ratio of the transmission rate in a first memory when a first switch device of the plurality of switch devices which include the first processor detects the path in which the transmission rate is decreased and the first switch device is set as a point of origin; determining, by a second processor, whether a plurality of packets pass through the path in which the transmission rate is decreased, based on the degeneration information when the plurality of packets are transmitted from a computer including the second processor; determining a length of a gap based on the decreasing ratio of the transmission rate when it is determined that the plurality of packets pass through the path in which the transmission rate is decreased; and transmitting the plurality of packets with a transmission interval determined based on the determined length of the gap.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 28 is a diagram illustrating an example of operation of the switch device as illustrated in FIG. 23; and FIG. 29 is a diagram illustrating an example of content of the management table in the switch device in a state as illustrated in FIG. 27.

DESCRIPTION OF EMBODIMENTS

Hereinafter, description is given of an embodiment with reference to drawings.

Figure 1:
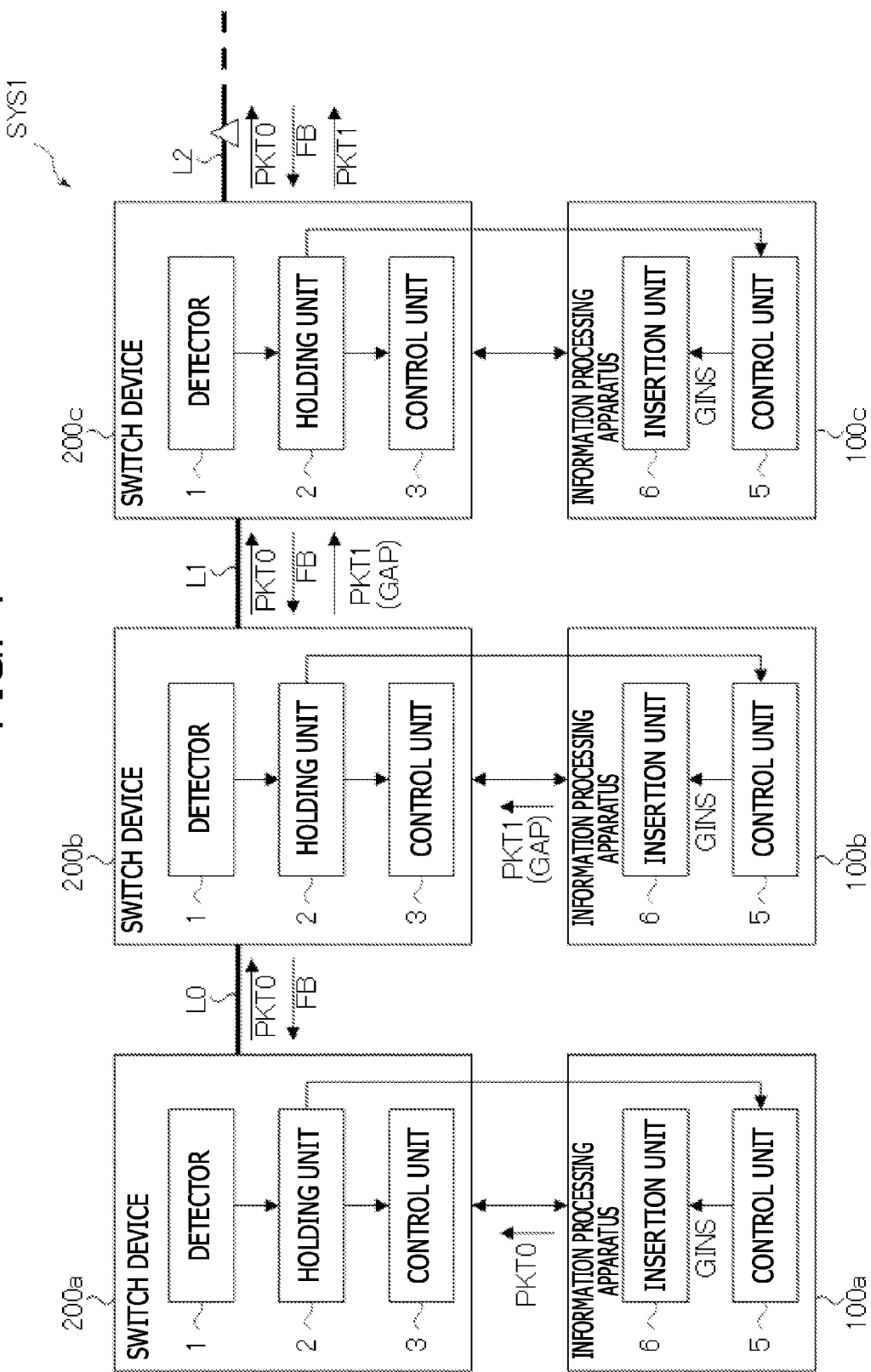
FIG. 1 is a diagram illustrating an information processing system, an information processing apparatus, a switch device, and a control method of the information processing system of an embodiment.

FIG. 1 is a diagram illustrating an information processing system, an information processing apparatus, a switch device, and a control method of the information processing system of an embodiment. An information processing system SYS1 as illustrated in FIG. 1 includes a plurality of information processing apparatuses 100 (100a, 100b, and 100c) which process information and a plurality of switch devices 200 (200a, 200b, and 200c). Each of the switch devices 200 is connected to the information processing apparatus 100. The switch device 200 is connected to another switch device 200 via a path L (L0, L1, and L2) to which a packet PKT (PKT0 and PKT1), which is generated by the information processing apparatus 100, is transmitted. The information processing apparatuses 100a, 100b, and 100c have the same or similar configuration as each other. The switch devices 200a, 200b, and 200c have the same or similar configuration as each other.

For example, each of the information processing apparatuses 100 includes a processor, a memory in which a program executed by the processor is stored, and a function of communicating with other information processing apparatuses 100. The information processing system SYS1 operates as a parallel computer system. FIG. 1 illustrates a one-dimensional network in which the plurality of information processing apparatuses 100 are connected to each other via the switch device 200 in the horizontal direction. The dimensionality of network, a topology (mesh, torus, or the like) and the number of the information processing apparatuses 100 are not limited to the number as illustrated in FIG. 1.

Each of the switch devices 200 includes a detector 1, a holding unit 2, and a control unit 3. The detector 1 of the switch device 200a detects a decrease in a transmission rate (bandwidth) of the packet in the path L0. The detector 1 of the switch device 200b detects a decrease in the transmission rate of the packet in the paths L0 and L1. The detector 1 of the switch device 200c detects the decrease in the transmission rate of the packet in the paths L1 and L2. For example, the transmission rate is decreased due to a failure of any one of a plurality of lanes included in each path is the decrease in the transmission rate. The transmission rate may be decreased when the operation of the lane is stopped so as to suppress electricity consumption.

The holding unit 2 holds degeneration information indicating the path L in which the decrease in the transmission rate is detected by the detector 1. The control unit 3 transmits the degeneration information toward the switch device 200 which is connected to the information processing apparatus 100 which is a transmission source of the packet. Alternatively, the control unit 3 stores the degeneration information which is received from other switch devices 200 in the holding unit 2.

Each of the information processing apparatuses 100 includes a control unit 5 and an insertion unit 6. The control unit 5 generates an insertion indication GINS indicating the insertion of a gap corresponding to the decrease in the transmission rate when the degeneration information indicating the path L through which the packet to be transmitted passes is held in the holding unit 2 of the switch device 200 connected to each of the information processing apparatuses 100. The insertion unit 6 inserts the gap between the packets passing through the path L indicated by the degeneration information based on the insertion indication GINS.

For example, when the degeneration information indicating the transmission rate being decreased down to 50% is held in the holding unit 2, the control unit 5 notifies the insertion unit 6 of the insertion indication GINS that a gap between packets is doubled compared with a case where the transmission rate is not decreased. Alternatively, when the degeneration information indicating the transmission rate being decreased down to 25% is held in the holding unit 2, the control unit 5 notifies the insertion unit 6 of the insertion indication GINS that a gap between packets is four times larger compared with a case where the transmission rate is not decreased.

In FIG. 1, a triangle mark attached to the path L2 indicates that the decrease in the transmission rate occurred in the path L2. Hereinafter, an example of an operation of the information processing system SYS1 in a case where the information processing apparatus 100a transmits the packet PKT0 to another information processing apparatus of a destination of the path L2 and the information processing apparatus 100b transmits the packet PKT1 to the another information processing apparatus of the destination of the path L2 will be described. In other words, the following example of the operation illustrates an aspect of the control method of the information processing system.

The packet PKT0 which is transmitted by the information processing apparatus 100a is transmitted to the switch device 200c via the switch device 200a, the path L0, the switch device 200b, and the path L1. The detector 1 of the switch device 200c holds degeneration information FB indicating the decrease in the transmission rate of the path L2 in holding unit 2 since the transmission rate of the path L2 transmitting the packet is being decreased. For example, the packet PKT0 is a packet which is not transmitted to the path L2 until the decrease in the transmission rate occurred in the path L2. For this reason, the congestion does not occur in the communication path while the information processing apparatus 100a transmits the packet PKT0. The control unit 3 of the switch device 200c controls the degeneration information FB to be transmitted toward the switch device 200a connected to the information processing apparatus 100a in response to the reception of the packet PKT0.

The control unit 3 of the switch device 200b controls the holding unit 2 to hold the received degeneration information and controls the degeneration information FB to be transmitted toward the switch device 200a. The control unit 3 of the switch device 200a controls the holding unit 2 to hold the received degeneration information FB. For example, the degeneration information FB is transmitted to the switch device 200a connected to the information processing apparatus 100a which is the transmission source of the packet PKT0, but is not transmitted to the information processing apparatus 100a. In this manner, the degeneration information FB is transmitted to each other of the switch devices 200 before the congestion occurs in the communication path.

Next, the information processing apparatus 100b transmits a plurality of the packets PKT1 to another information processing apparatus of the destination of the path L2. The control unit 5 of the information processing apparatus 100b controls the insertion unit 6 to be notified of the insertion indication GINS according to the decreasing rate of the transmission rate which is indicated by the degeneration information FB since the holding unit 2 of the switch device 200b holds the degeneration information FB of the path L2. The insertion unit 6 of the information processing apparatus 100b inserts a gap GAP according to the insertion indication GINS between the packets PKT1, and causes the packet PKT1 having the gap GAP inserted therein to be transmitted to another information processing apparatus of the destination of the path L2. That is, the information processing apparatus 100 connected to the switch device 200 in which the holding unit 2 holds the degeneration information FB can insert the gap GAP corresponding to the decreasing rate of the transmission rate between the packets. The switch device 200c can transmit the packet PKT1 toward another information processing apparatus of the destination of the path L2 with the transmission rate according to the decreasing rate of the transmission rate of the path L2. For this reason, for example, it is possible to suppress a buffer for the packet PKT provided in each of the switch devices 200 from being clogged, thereby suppressing the congestion.

As above, in the embodiment as illustrated in FIG. 1, each of the information processing apparatuses 100 can transmit the packet by inserting the gap GAP between the packets in response to the decrease in the transmission rate of the path L before the congestion occurs. As a result, even in a case where the transmission rate in the path L to which the packet is transmitted is decreased, it is possible to suppress occurrence of the congestion which causes the decrease in the transmission rate. Further, it is possible to suppress the degradation of performance of the information processing system SYS1 due to the congestion.

Figure 2:
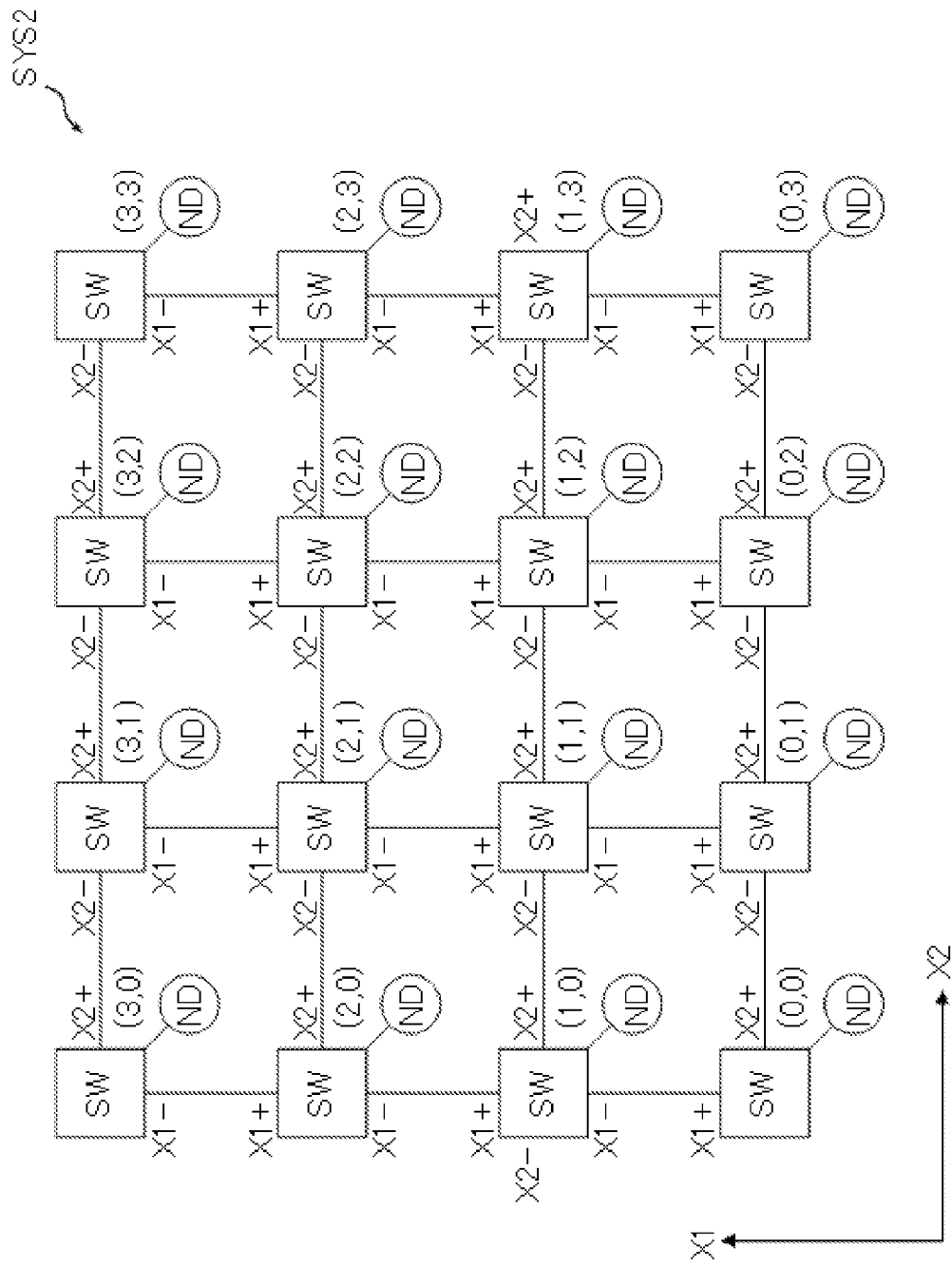
FIG. 2 is a diagram illustrating an information processing system, an information processing apparatus, a switch device, and a control method of the information processing system of another embodiment.

FIG. 2 illustrates an information processing system, an information processing apparatus, a switch device, and a control method of the information processing system of another embodiment. An information processing system SYS2 of the embodiment has a network in which a plurality of nodes ND are connected to each other via a switch device SW and operates as a parallel computer. FIG. 2 indicates an example of a mesh-type two-dimensional network in which four nodes ND are respectively disposed in the direction of an axis X1 and an axis X2. The dimensionality of the network, the topology (the mesh, the torus, or the like) and the number of the nodes ND is not limited to the example in FIG. 2. For example, each of the nodes ND includes the processor, a memory in which a program executed by the processor is stored, and a function of communicating with other nodes ND. The node ND is an example of the information processing apparatus processing information.

In FIG. 2, a value (3, 0) or the like which is indicated on the lower right of the switch device SW indicates an address. The left value of (3, 0) or the like indicates an address (the number of axis X1) of the axis X1 of the switch device SW and the node ND connected to the switch device SW. The right value of (3, 0) or the like indicates an address (the number of axis X2) of the axis X2 of the switch device SW and the node ND connected to the switch device SW. Signs respectively indicated on the left side, right side, upper side, and lower side of the switch device SW indicate an axial direction (X1+, X1−, X2+, and X2−) of the path (link) which is connected to adjacent other switch devices SW.

The information processing system SYS2 employs a dimension order routine which determines the transmission path of the packet in the direction of the address being increased in order of the axis X1 and the axis X2, and determines the transmission path of the packet in the direction of the address being decreased in order of the axis X2 and the axis X1. The information processing system SYS2 may employ a source routine in which the node ND transmitting the packet determines the transmission path of the packet.

For example, the path allowing two switch devices SW to connect to each other has a plurality of interfaces for serial transmission, which are disposed in parallel between the switch devices SW. For example, each of the interfaces is referred to as a lane. In the example in FIG. 2, four lanes are connected to each other between two switch devices SW. The data transmission rate of the lane, for example, is 1.25 Gbps (Gigabits per second; 1.25 bits per second).

In the information processing system SYS2, when one to three of the lanes are damaged between two switch devices SW which are adjacent to each other, it is possible to transmit information by using the residual lanes. In this case, the communication performance is degraded, but it is possible to transmit information between all the switch devices SW. In the following description, a state where the number of the lanes to operate is decreased and thus the transmission rate of the packet between the switch devices SW is decreased is referred to as a lane degeneration. The information processing system SYS2 may stop the operation of one to three of the lanes so as to suppress electricity consumption.

In a case where the information is communicated between the nodes ND in the information processing system SYS2, the transmission source node ND divides the information and then generates the packet. Then, the transmission source node ND transmits the generated packet to the switch device SW which is connected to the node ND. Each of the switch devices SW determines, when the packet is received from the node ND or other switch devices SW, an output destination (in other words, the axial direction) of the packet based on the information indicating a destination included in the packet. Thereafter, the switch device SW transmits the packet toward the determined output destination. Then, the packet is transmitted to the destination of the node ND by repeating a transmission operation of the packet by the switch device SW.

Figure 3:
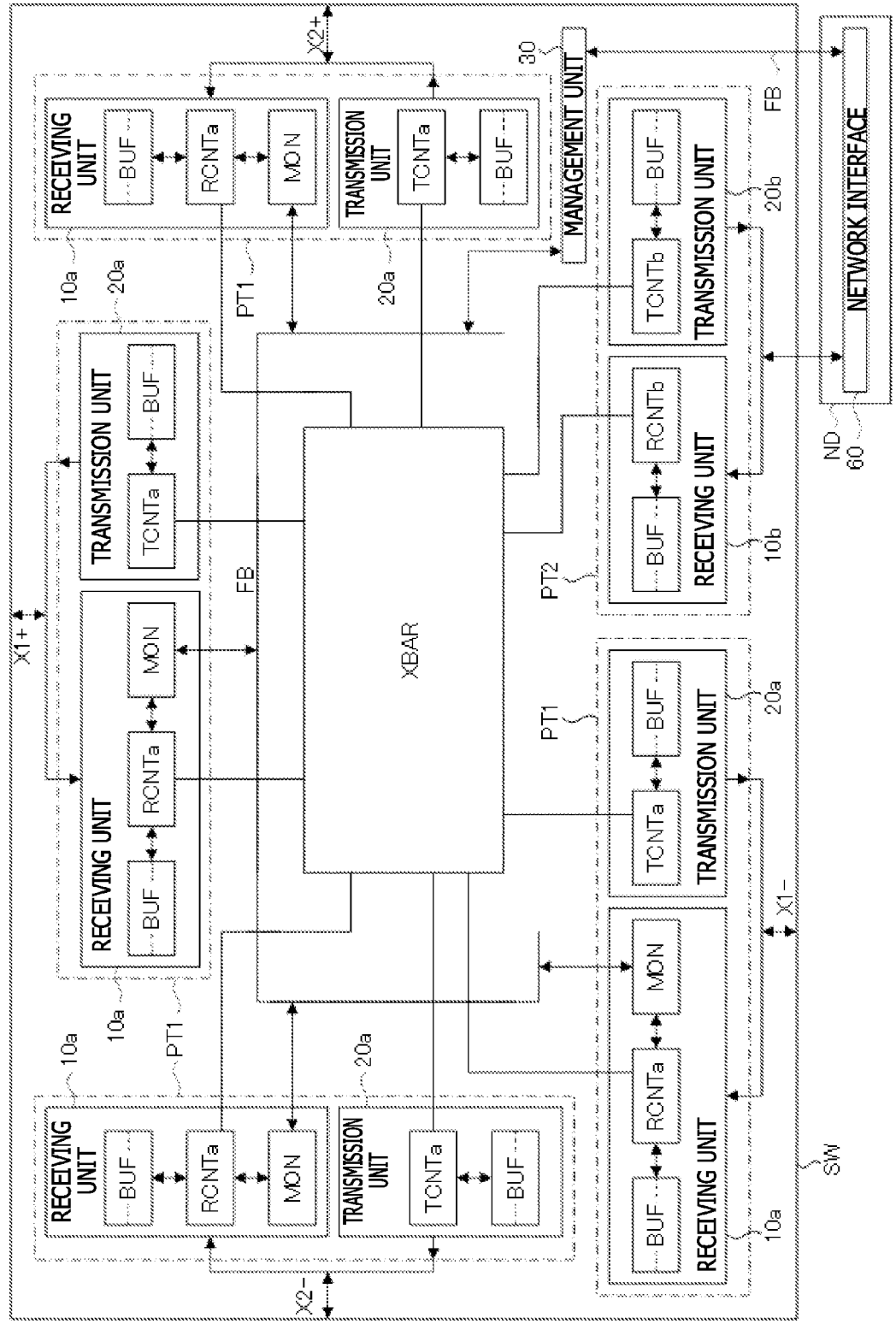
FIG. 3 is a diagram illustrating an example of a switch device as illustrated in FIG. 2.

FIG. 3 illustrates an example of the switch device SW as illustrated in FIG. 2. The switch device SW includes four ports PT1 each of which is connected to axes X1+, X1−, X2+, and X2−, a port PT2 which is connected to the node ND, a management unit 30, and a cross bar switch XBAR. Each of the ports PT1 includes a receiving unit 10a and a transmission unit 20a. The port PT2 includes a receiving unit 10b and a transmission unit 20b.

Each of the receiving units 10a includes a control unit RCNTa, a buffer unit BUF, and a monitoring unit MON monitoring the lane degeneration of the axis (the path and the link) connected to the receiving unit 10a. The monitoring unit MON may be provided in another portion of the port PT1. The control unit RCNTa controls the buffer unit BUF to store the packet to be received via the path. The control unit RCNTa controls the monitoring unit MON to output the detected information when the decrease in the transmission rate of the packet is detected in the connected path. The control unit RCNTa is an example of the detector detecting the decrease in the transmission rate of the packet in the path connected to the switch device SW.

When the monitoring unit MON receives the information indicating the lane degeneration from the control unit RCNTa, the monitoring unit MON outputs the received information to the management unit 30. The monitoring unit MON reads out the degeneration information FB from the management unit 30 based on the request from the control unit RCNTa. In addition, the monitoring unit MON outputs the read degeneration information FB to the control unit RCNTa. The control unit RCNTa generates the packet including the degeneration information FB received from the monitoring unit MON. Then, the control unit RCNTa transmits the generated packet to a control unit TCNTa of the transmission unit 20a in the same port PT1 via the cross bar switch XBAR.

Figure 7:
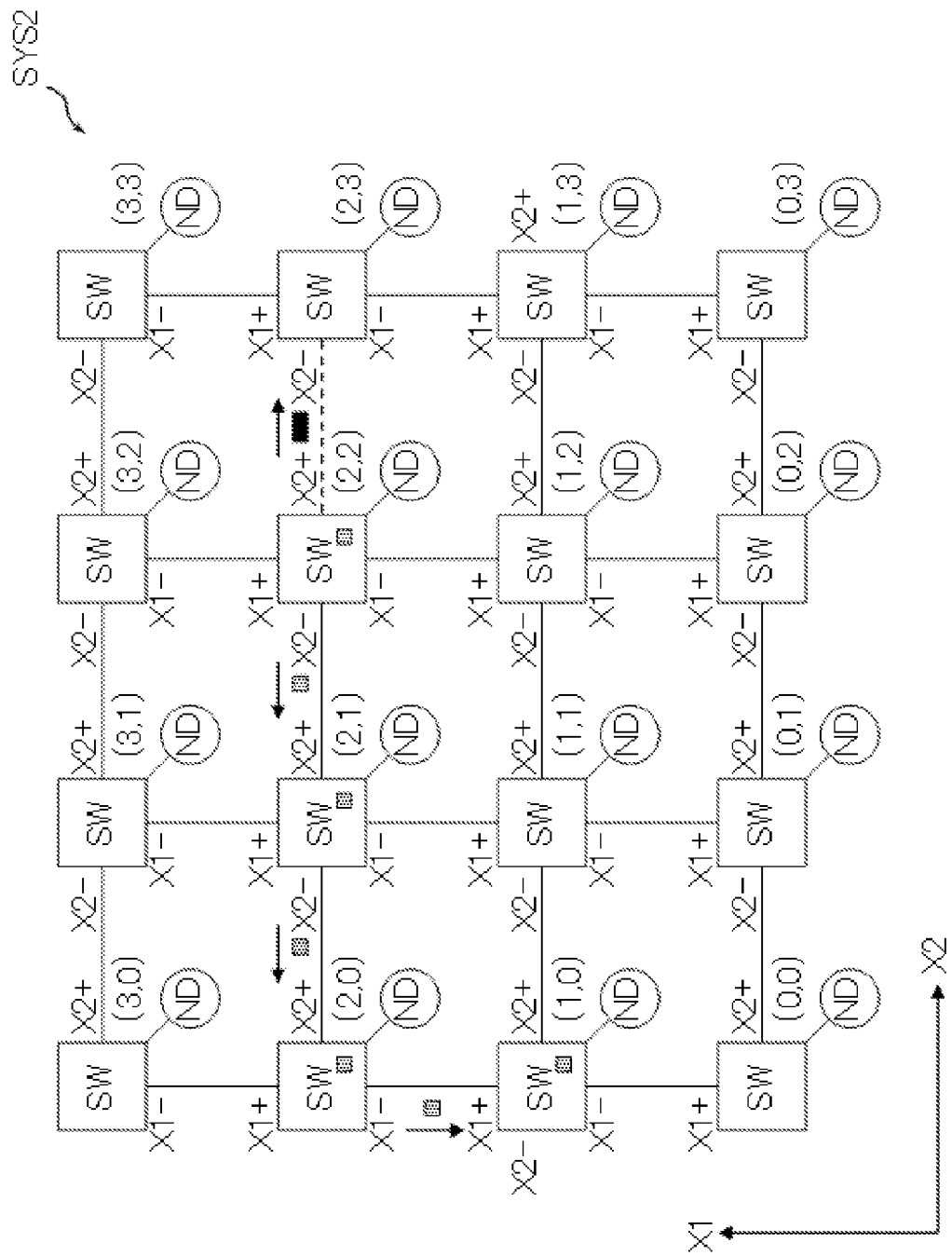
FIG. 7 is a diagram illustrating an example in which a degeneration notification packet is transmitted to a switch device in the information processing system as illustrated in FIG. 2.

Each of the transmission units 20a includes the control unit TCNTa and the buffer unit BUF. The control unit TCNTa controls the buffer unit BUF to store the packet to be transmitted via the cross bar switch XBAR. Then, the control unit TCNTa controls the packet read out from the buffer unit BUF to be transmitted to the path (axis). The control unit TCNTa controls the degeneration information FB received from the control unit RCNTa in the same port PT1 to the path as the packet (the degeneration notification packet as illustrated in FIG. 7). The control units RCNTa and TCNTa, and the monitoring unit MON are examples of a first control unit which transmits the degeneration information FB toward the switch device SW connected to the transmission source node ND of the packet and stores the degeneration information FB received from other switch devices SW in the management unit 30.

The receiving unit 10b of the port PT2 includes a control unit RCNTb and the buffer unit BUF. The control unit RCNTb controls the buffer unit BUF to store the packet received from a network interface 60 of the node ND. Then, the control unit RCNTb controls the packet stored in the buffer unit BUF to be output to the cross bar switch XBAR. The transmission unit 20b includes a control unit TCNTb and the buffer unit BUF. The control unit TCNTb controls the buffer unit BUF to store the packet to be transmitted via the cross bar switch XBAR. The control unit TCNTb controls the packet read out from the buffer unit BUF to be transmitted to the network interface 60 of the node ND. For example, the buffer unit BUF is a FIFO (First-In First-Out) buffer. The buffer unit BUF temporarily holds the packets transmitted from the control unit RCNTa (or TCNTa, RCNTb, or TCNTb).

Figure 5:
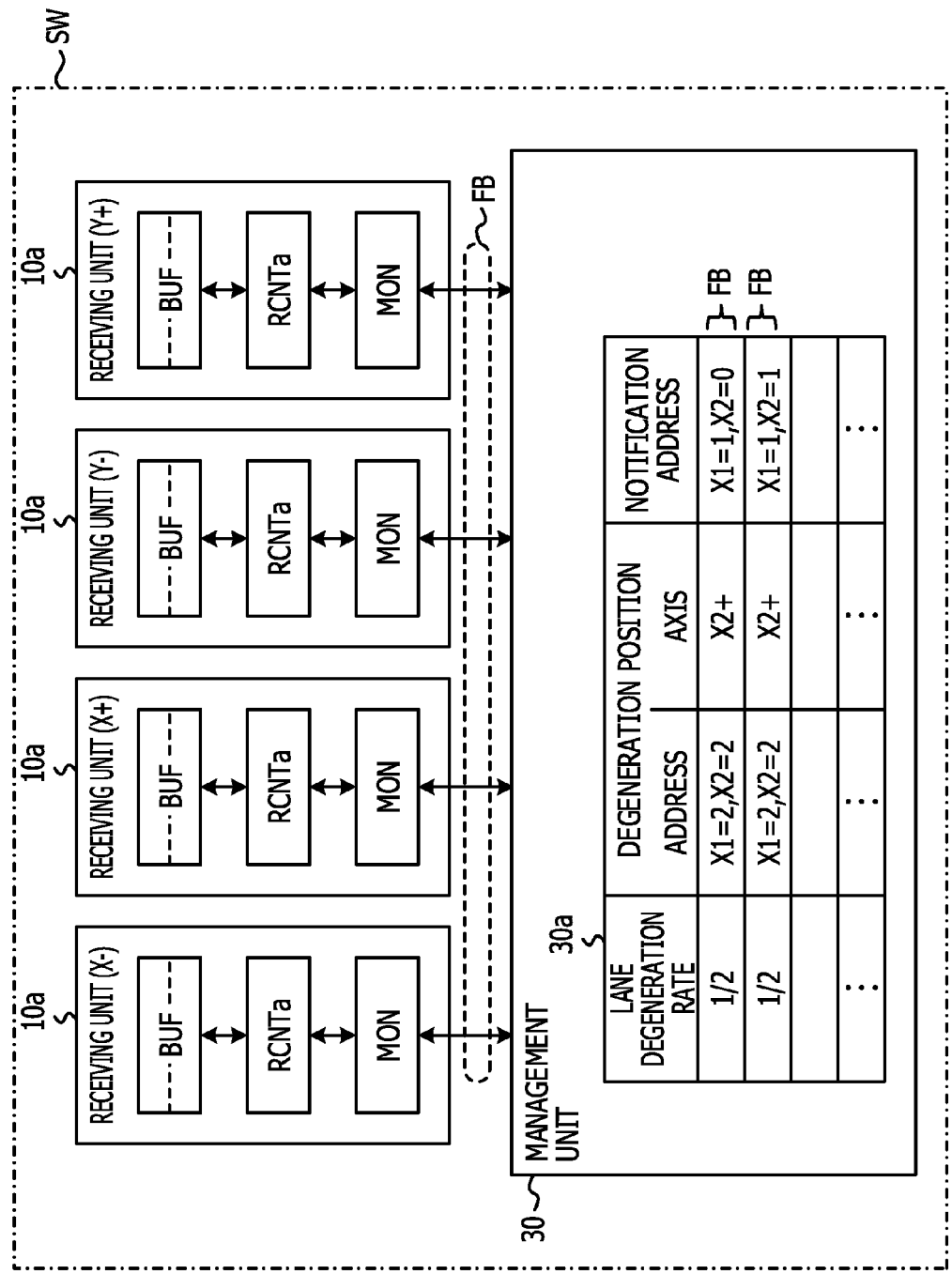
FIG. 5 is a diagram illustrating an example of a management unit as illustrated in FIG. 2.

The management unit 30 holds information indicating a position of the path in which the lane is degenerated, the degeneration rate indicating the rate of the degenerated lane, and the information indicating a notification destination of the information in which the lane is degenerated as the degeneration information FB. The degeneration information FB held in the management unit 30 is likely to be read out and written by the monitoring unit MON in each of the receiving units 10a, and thus is read out by the network interface 60 of the node ND. An example of the management unit 30 is illustrated in FIG. 5.

Figure 4:
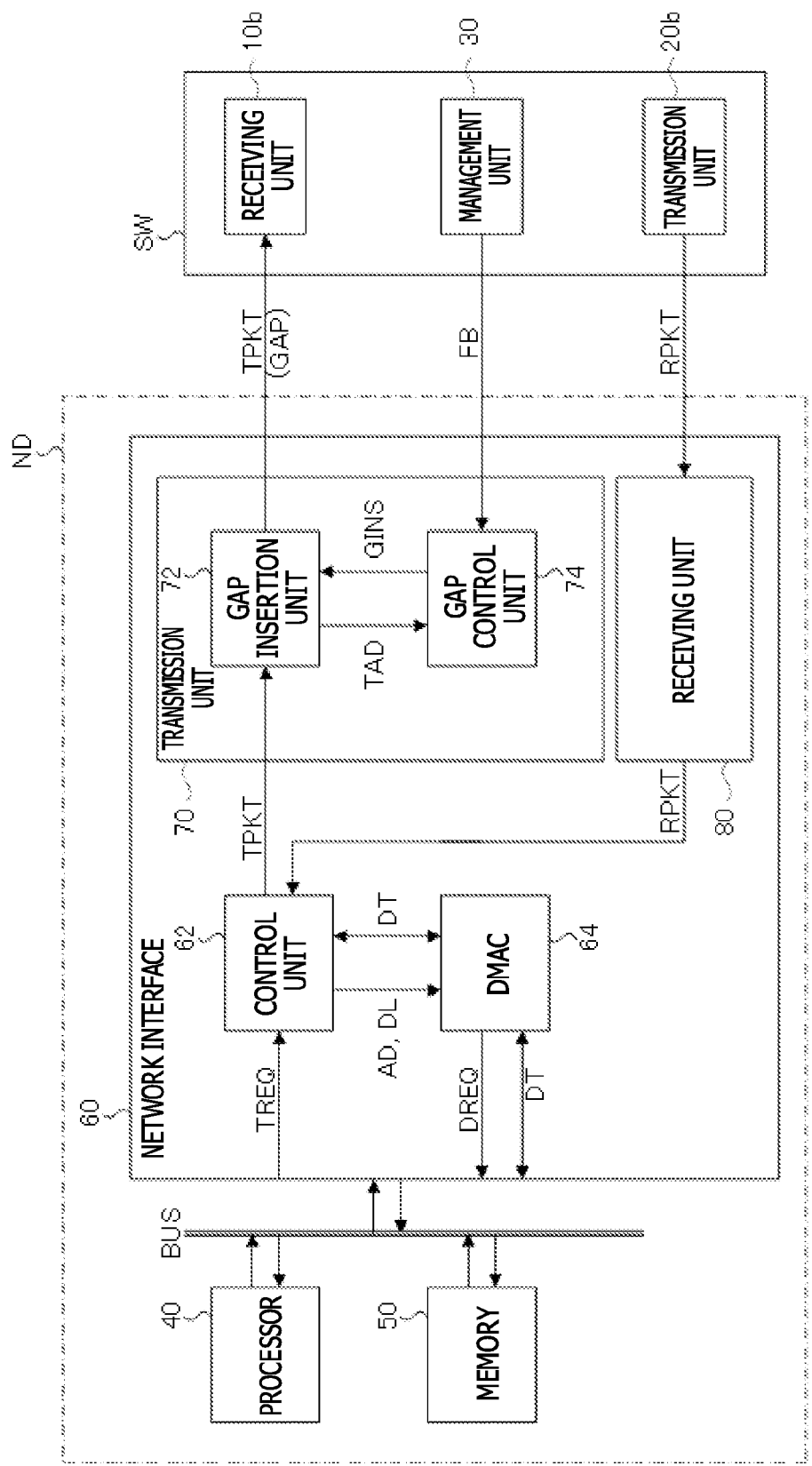
FIG. 4 is a diagram illustrating an example of a node as illustrated in FIG. 2.

The cross bar switch XBAR, based on the destination information included in the packet from the receiving units 10a and 10b, determines the transmission units 20a and 20b which output the packet and transmit the packet to the determined transmission unit 20a or the transmission unit 20b FIG. 4 illustrates an example of the node ND as illustrated in FIG. 2. The node ND includes a processor 40, a memory 50, and a network interface 60 which are connected to each other via a bus BUS. For example, the processor 40 operates by executing the program stored in the memory 50 and controls all operations of the node ND. The memory 50 has an area that records a program executed by the processor 40, the information such as data included in the packet which is transmitted to the switch device SW, and the information such as data included in the packet which is received from the switch device SW.

The network interface 60 includes a control unit 62, a DMAC (Direct Memory Access Controller) 64, a transmission unit 70, and a receiving unit 80. The control unit 62 outputs indication (an address AD and a data length DL) reading data included in a packet TPKT to the DMAC 64 based on a transmission indication TREQ of the packet which is output from the processor 40. The DMAC 64 issues a data transmission request DREQ based on the control unit 62, and then reads out the data DT from the memory 50. The control unit 62 generates the packet TPKT by using the data DT read out by the DMAC 64 from the memory 50. Then, the control unit 62 outputs the generated packet TPKT to the transmission unit 70. The control unit 62, when the packet RPKT is received from the receiving unit 80, controls the DMAC 64 and stores the information such as data included in the received packet RPKT in memory 50.

The transmission unit 70 includes a gap insertion unit 72 and a gap control unit 74. The gap insertion unit 72 outputs a destination address TAD included in the packet TPKT to the gap control unit 74. Therefore, the gap insertion unit 72 receives the insertion indication GINS of the gap from the gap control unit 74. The gap insertion unit 72 inserts the gap GAP between the packets in accordance with the rate of the insertion indication GINS. For example, the gap insertion unit 72 sets a ratio of the packet TPKT and the gap GAP to 3:1 when the insertion indication GINS is "25% of insertion". The gap insertion unit 72 sets a ratio of the packet TPKT and the gap GAP to 1:1 when the insertion indication GINS is "50% of insertion". If there is no insertion indication GINS, the gap insertion unit 72 transmits the packet TPKT to the receiving unit 10b of the switch device SW without inserting the gap GAP.

The gap control unit 74 determines, based on the destination address TAD, whether the packet passes through the path, in which the lane degeneration occurred, included in the degeneration information FB received from the management unit 30. When the packet passes through the path in which the lane degeneration occurred, the gap control unit 74 creates the insertion indication GINS of the gap GAP based on the degeneration rate of the lane included in the degeneration information FB. When the packet does not pass through the path in which the lane degeneration occurred, the gap control unit 74 does not create the insertion indication GINS. For this reason, when the packet passes through the path in which the lane degeneration occurred, the gap insertion unit 72 can insert the gap GAP between the packets according to the degeneration rate of the lane. The gap control unit 74 is an example of a second control unit which generates the insertion indication GINS indicating the insertion of the gap according to the decrease in the transmission rate when the degeneration information FB indicating the path to which the packet to be transmitted passes is held in the management unit 30 of the switch device SW connected to the node ND.

Figure 13:
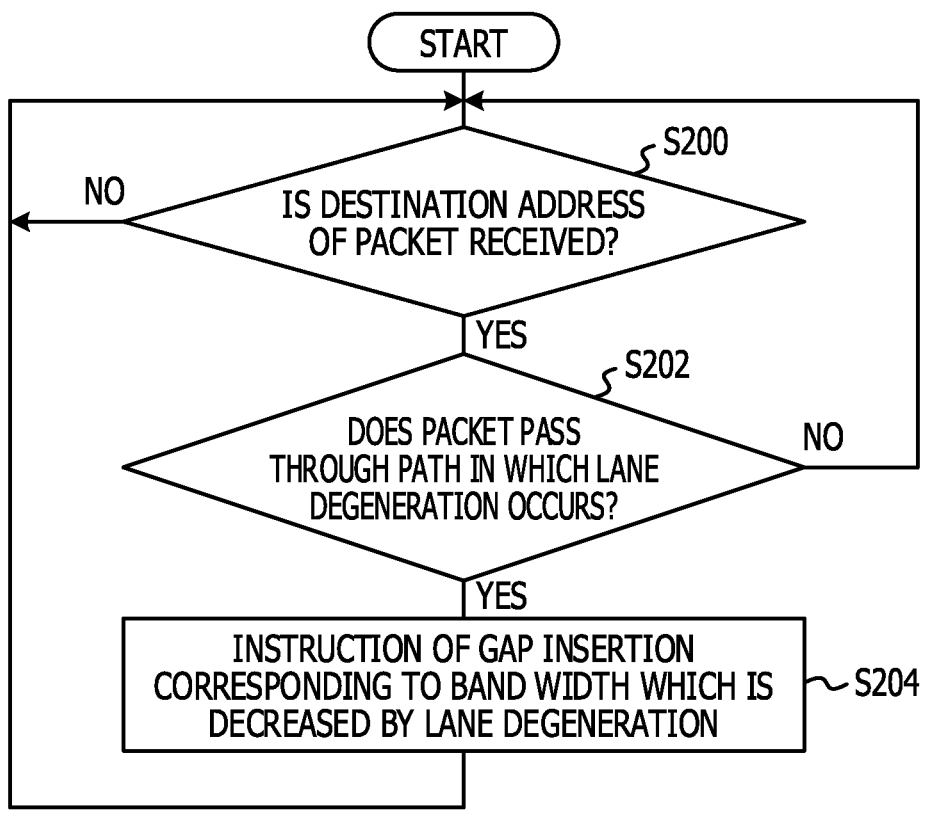
FIG. 13 is a diagram illustrating an example of an operation of a gap control unit in a network interface as illustrated in FIG. 4.

The receiving unit 80 outputs the packet RPKT which is received from the transmission unit 20b of the switch device SW to the control unit 62. An example of the operation of the network interface 60 is illustrated in FIG. 13.

FIG. 5 illustrates an example of the management unit 30 in FIG. 2. The management unit 30 includes the management table 30a storing the content of the degeneration information FB which is output from each of the receiving units 10a. The management table 30a has an area which stores the lane degeneration rate indicating a degree of the degeneration of the lane (the degree of the decrease in the transmission rate due to the lane degeneration), the degeneration position indicating a position in which the lane degeneration occurred, and a notification destination address indicating the destination of the degeneration information FB. In the area of the degeneration position, the address of the switch device SW connected to the path in which the lane degeneration occurred and the axis and the axial direction in which the lane degeneration occurred are stored. The management table 30a is an example of the holding unit which holds the degeneration information FB including the information which indicates the detected path in which the decrease in the transmission rate is detected.

A first line in a management table 30a as illustrated in FIG. 5 indicates that the lane degeneration occurred with half of the degeneration rate (50%) in the path of the switch device SW, indicated by the axis X1 of "2" and the axis X2 of "2", in the + direction of the axis X2. The first line of the management table 30a indicates that the degeneration notification packet including the degeneration information FB is transmitted to the switch device SW which is indicated by the axis X1 of "1" and the axis X2 of "0". The first line of the management table 30a indicates an example of the degeneration information FB of the switch devices SW at the addresses (2, 2), (2, 1), (2, 0), and, (1, 0) stored in the management unit 30 by the operation as illustrated in FIG. 7.

Figure 11:
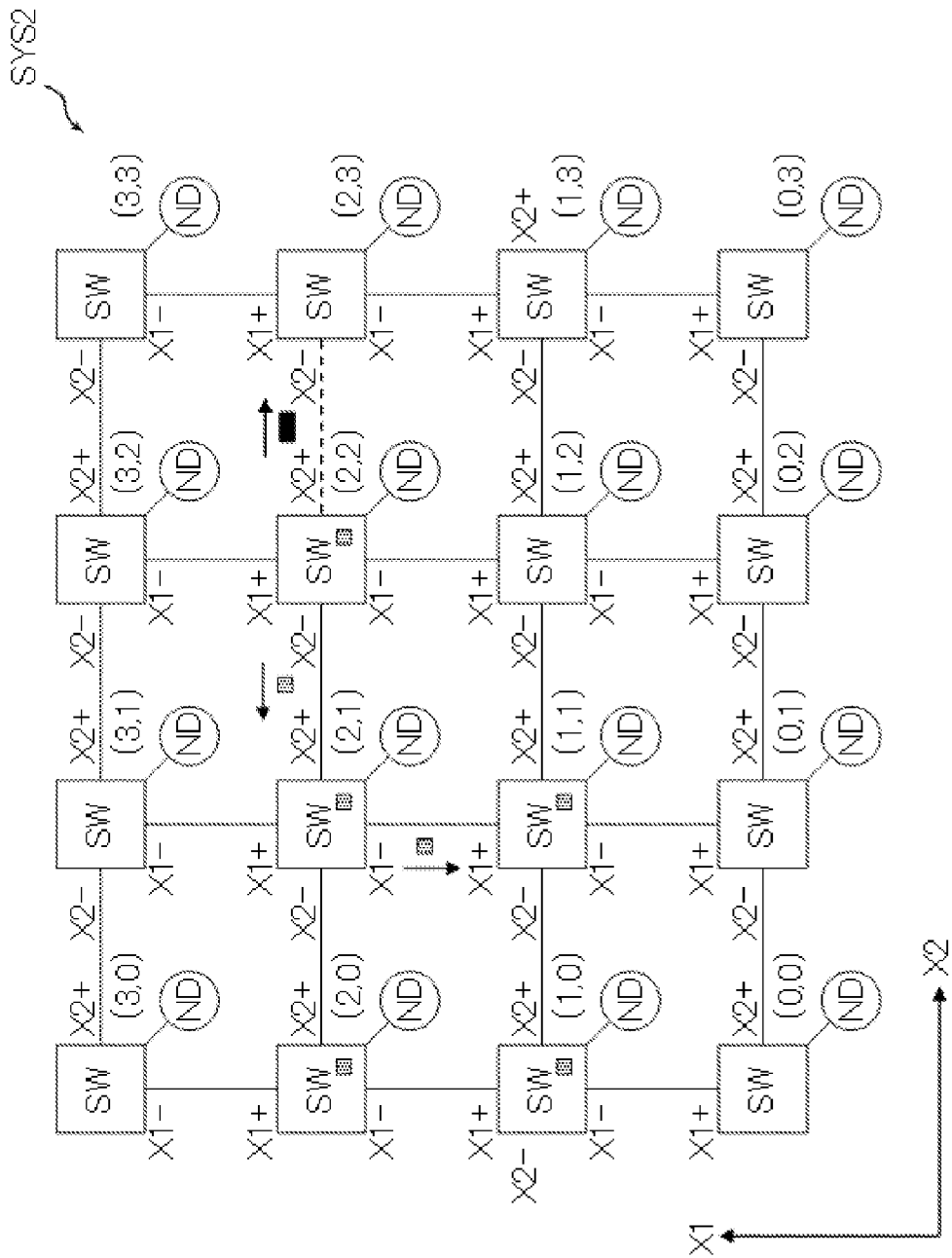
FIG. 11 is a diagram illustrating another example in which the degeneration notification packet is transmitted to a switch device in the information processing system as illustrated in FIG. 2.

The second line of the management table 30a indicates that the lane degeneration occurred with half of the degeneration rate (50%) of that in the path of the switch device SW, indicated by the axis X1 of "2" and the axis X2 of "2", in + direction of the axis X2. The second line of the management table 30a indicates that the degeneration notification packet including the degeneration information FB is transmitted to the switch device SW which is indicated by the axis X1 of "1" and the axis X2 of "1". The second line of the management table 30a indicates an example of the degeneration information FB of the switch devices SW at the addresses (2, 2), (2, 1), and (1, 1), stored in the management unit 30 by the operation as illustrated in FIG. 11. In this manner, the management table 30a holds the lane degeneration rate and the degeneration position for each of the notification destination addresses from which the degeneration notification packet is transmitted. By holding the degeneration information FB to the management table 30a for the notification destination address, even in a case where the plurality of switch devices SW are connected to each other via the plurality of paths, it is possible to determine the switch device SW which is notified of the degeneration information FB by referring to the management table 30a.

Figure 6:
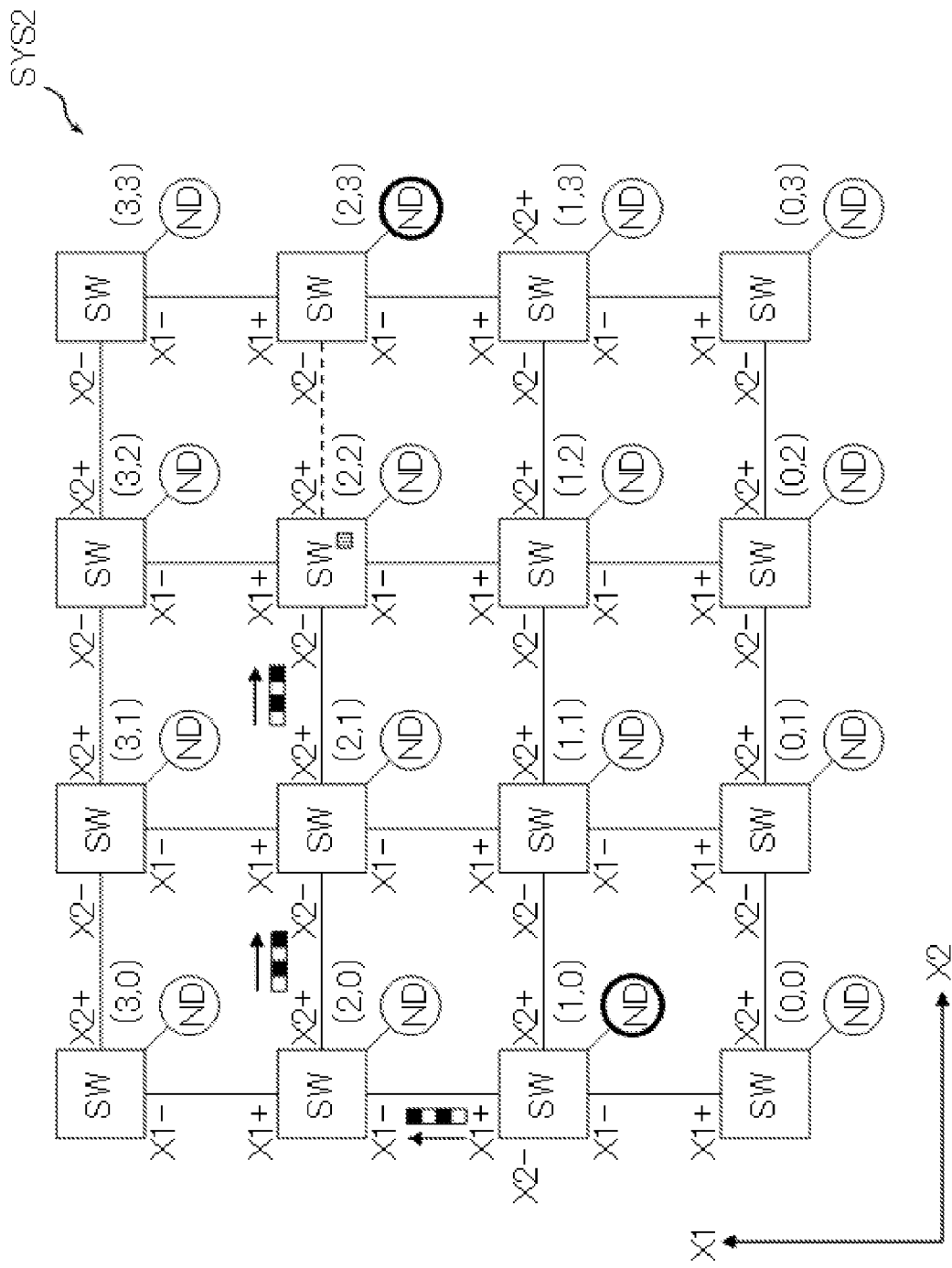
FIG. 6 is a diagram illustrating an example of transmission of a packet in the information processing system as illustrated in FIG. 2.

FIG. 6 illustrates an example of transmission of the packet in the information processing system SYS2 as illustrated in FIG. 2. In the example in FIG. 6, the lane degeneration having half of the lane degeneration rate currently occurs in the path of the switch device SW at the address (2, 2) in the + direction of the axis X2. The path in which the lane degeneration occurred is indicated by the broken line.

In the example in FIG. 6, the node ND at the address (1, 0) indicated by a thick circle transmits the packet to the node ND at the address (2, 3) as a destination. An arrow indicates a transmission direction of the packet. A black square on the side of the arrow indicates the packet. A white square on the side of the arrow indicates the gap. In this example, the fact that the node ND at the address (1, 1) is likely to transmit the packet passing through the switch device SW in the + direction of the axis X2 is known in advance. Accordingly, in order to suppress occurrence of the congestion, the node ND at the address (1, 0) inserts a gap between the packets.

In accordance with the rule of the dimension order routine, the packet is transmitted to the switch device SW, in the destination node ND, indicating the address "2" of the axis X1 in the "+" direction of the axis X1. Thereafter, the packet is transmitted to the switch device SW, in the destination node ND, indicating the address "3" of the axis X2 in the "+" direction of the axis X2. The switch device SW at the address (2, 2) detects that, based on the destination information included in the packet, the packet passes through the path in which the lane degeneration occurred in the "+" direction of the axis X2, and stores the degeneration information FB in the management table 30a. A netting square in the switch device SW at the address (2, 2) indicates the degeneration notification packet stored in the management table 30a. The degeneration information FB stored in the management table 30a indicates the first line of the management table 30a in FIG. 5.

FIG. 7 illustrates an example in which a degeneration notification packet is transmitted to the switch device SW in the information processing system SYS2 as illustrated in FIG. 2. FIG. 7 subsequently illustrates the operation illustrated in FIG. 6. The address (2, 2) of the switch device SW connected to the lane in which the degeneration that occurred transmits the degeneration notification packet including the degeneration information FB toward the transmission source node ND (address (1, 0)). The netting square indicates the degeneration notification packet. The arrow of the netting square on the side indicates the transmission direction of the degeneration notification packet.

The switch device SW at the address (2, 2) transmits the degeneration notification packet, and then transmits the packet transmitted from the node ND at the address (1, 0) to the path in which the lane is degenerated. The transmission rate of the packet which is transmitted from the switch device SW at the address (2, 2) is reduced by half compared with a case where the lane degeneration does not occur. Then, the packet transmitted from the node ND at the address (1, 0) is transmitted to the node ND at the address (2, 3) via the switch device SW at the address (2, 3).

In accordance with the rule of the dimension order routine, the degeneration notification packet is transmitted to the switch device SW, in the destination node ND, indicating the address "0" of the axis X1 in the "−" direction of the axis X2. Thereafter, the degeneration notification packet is transmitted to the switch device SW, in the destination node ND, indicating the address "1" of the axis X1 in the "−" direction of the axis X1.

The switch device SW which receives the degeneration notification packet stores the degeneration information FB included in the degeneration notification packet in the management table 30a of the management unit 30. In addition, the corresponding switch device SW transmits the degeneration notification packet to the next the switch device SW. The degeneration notification packet is transmitted to the switch device SW connected to the transmission source node ND, but is not transmitted to the transmission source node ND. The switch device SW at the address (2, 2) may store the degeneration information FB in the management unit 30 at the time when the lane degeneration occurs in the path in the + direction of the axis X2.

Figure 8:
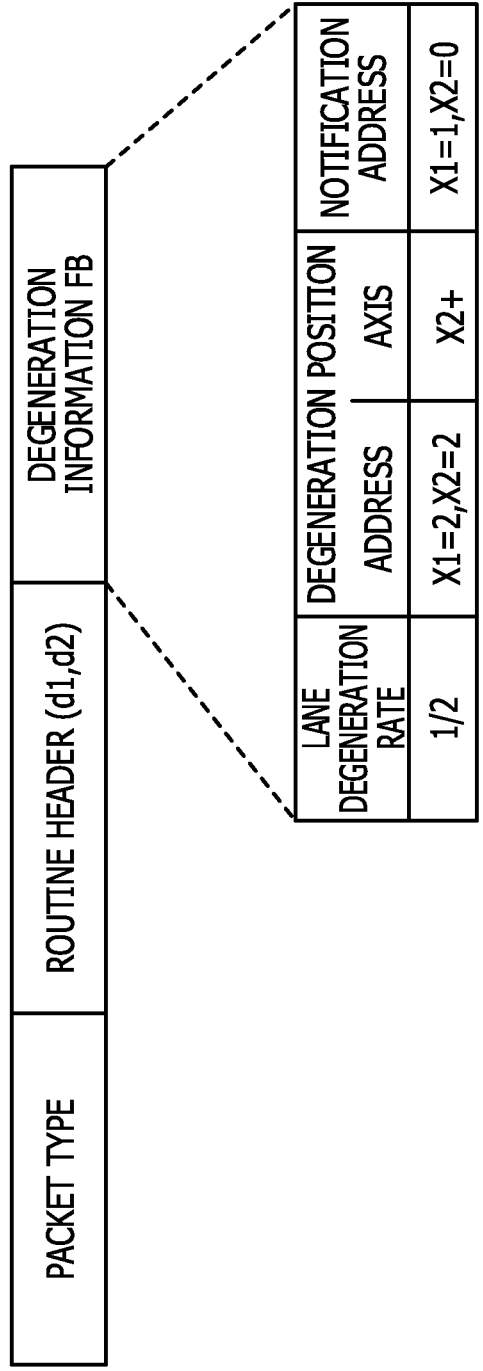
FIG. 8 is a diagram illustrating an example of a format of the degeneration notification packet as illustrated in FIG. 7.

FIG. 8 illustrates an example of a format of the degeneration notification packet as illustrated in FIG. 7. The degeneration notification packet includes a packet type, a routine header (d1, d2), and the degeneration information FB. In the area of the degeneration information FB, the same as or similar to the information stored in the management table 30a as illustrated in FIG. 5 is set. In the packet type area, information that the packet is the degeneration notification packet is set. In the area of the routine header, a relative address (d1, d2) indicating the distance between the switch device SW which detects the lane degeneration and the transmission source switch device SW is set. The relative address in the routine header is decremented "one by one" every time when each of the switch devices SW receives the degeneration notification packet. Then, at the time when the relative address becomes (0, 0), the transmission of the degeneration notification packet is completed.

For example, in FIG. 7, the switch device SW at the address (2, 2) sets (1, 2) as the routine header and transmits the degeneration notification packet to the switch device SW at the address (2, 1). The switch device SW at the address (2, 1) changes the routine header to (1, 1) and transmits the degeneration notification packet to the switch device SW at the address (2, 0). The switch device SW at the address (2, 0) changes the routine header to (1, 0) and transmits the degeneration notification packet to the switch device SW at the address (1, 0). Since the changed routine header becomes (0, 0), the switch device SW at the address (1, 0) does not transmit the degeneration notification packet.

Figure 9:
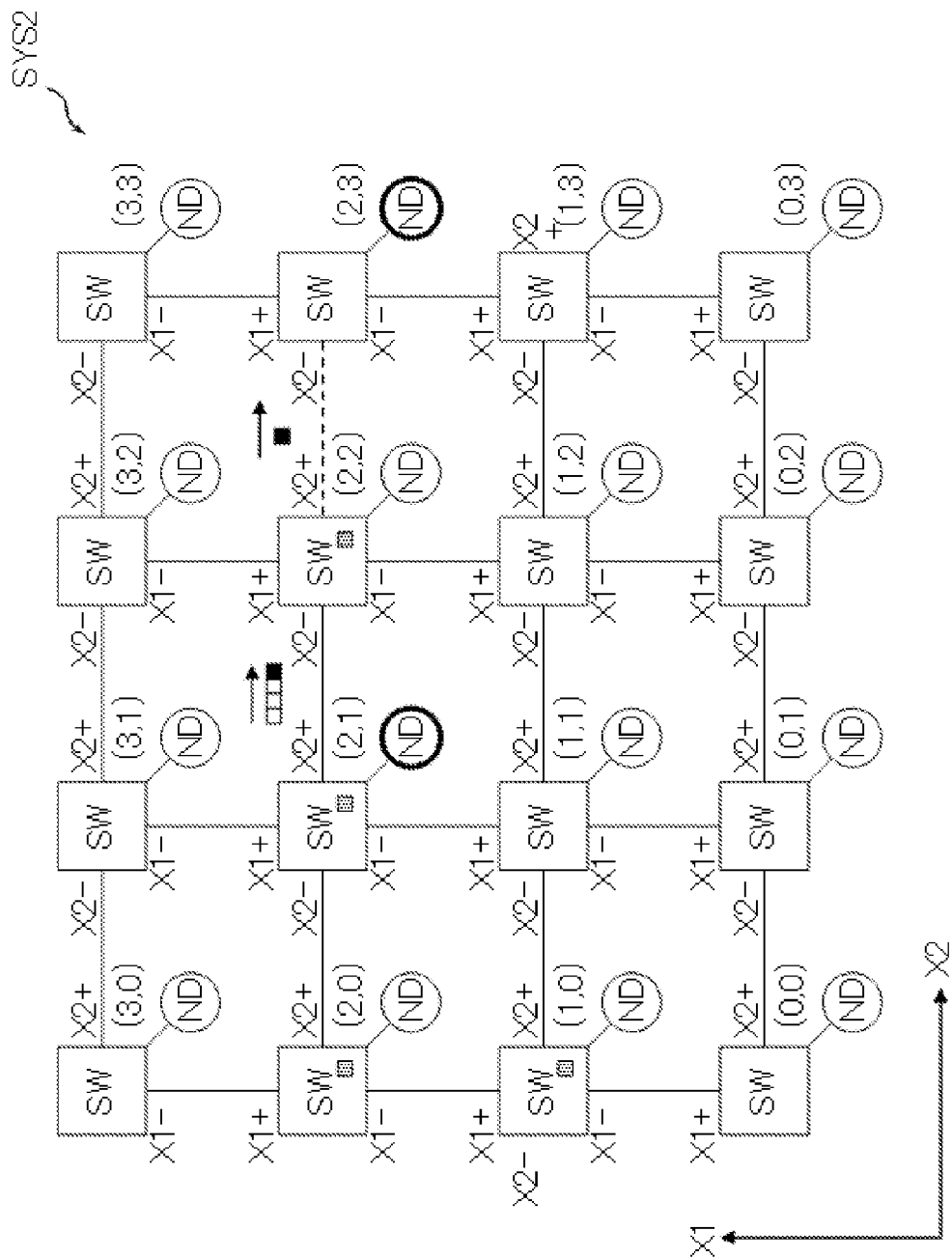
FIG. 9 is a diagram illustrating an example in which the packet is transmitted after the transmission of the degeneration notification packet in the information processing system as illustrated in FIG. 2.

FIG. 9 illustrates an example in which the packet is transmitted after the transmission of the degeneration notification packet in the information processing system SYS2 as illustrated in FIG. 2. FIG. 9 subsequently illustrates the operation illustrated in FIG. 7. Regarding the same as or similar to the operation illustrated in FIG. 6, the same marks or signs as those of the operation illustrated in FIG. 6 are denoted, and the specific description will not be repeated.

In the example in FIG. 9, the packet is transmitted from the node ND at the address (2, 1) indicated by the thick circle to the node ND at the address (2, 3). In the first line of the management table 30a as illustrated in FIG. 5, the address (2, 1) is included in the path between the address of the notification destination and the address of the degeneration position. For this reason, the switch device SW at the address (2, 2) does not transmit the degeneration notification packet to the address (2, 1). Here, the switch device SW at the address (2, 1) already held the degeneration information FB in the management table 30a by the operation in FIG. 7. In this manner, in a case where the switch device SW which is present in the path between the address of the notification destination and the address of the degeneration position already received the degeneration information FB, it is possible to avoid repeatedly transmitting the degeneration information FB, thereby suppressing an increase in a load on the network.

The node ND at the address (2, 1) refers to the degeneration information FB stored in the management table 30a of the switch device SW at the address (2, 1). Then, the node ND at the address (2, 1) detects that the lane degeneration having half of the lane degeneration rate currently occurs in the transmission path of the packet. For this reason, the node ND at the address (2, 1) inserts the gap between the packets and reduces the transmission rate of the packet by half of the transmission rate in FIG. 6. Accordingly, it is possible to suppress occurrence of the congestion in the path in which the lane degeneration occurred. Since the occurrence of congestion is suppressed, it is possible to suppress the buffer unit BUF, through which the packet passes, of the switch device SW from being clogged. That is to say, it is possible to suppress the occurrence of the congestion due to the buffer BUF being clogged. As a result, in a case where the destination transmits the packet to a destination other than the address (2, 3), it is possible to suppress occurrence of the congestion in the transmission path in a chain reaction. For example, it is possible to perform the transmission of the packet from the node ND at the address (1, 1) to the node at the address (3, 3) without inserting the gap GAP between the packets and causing the congestion to occur.

Figure 10:
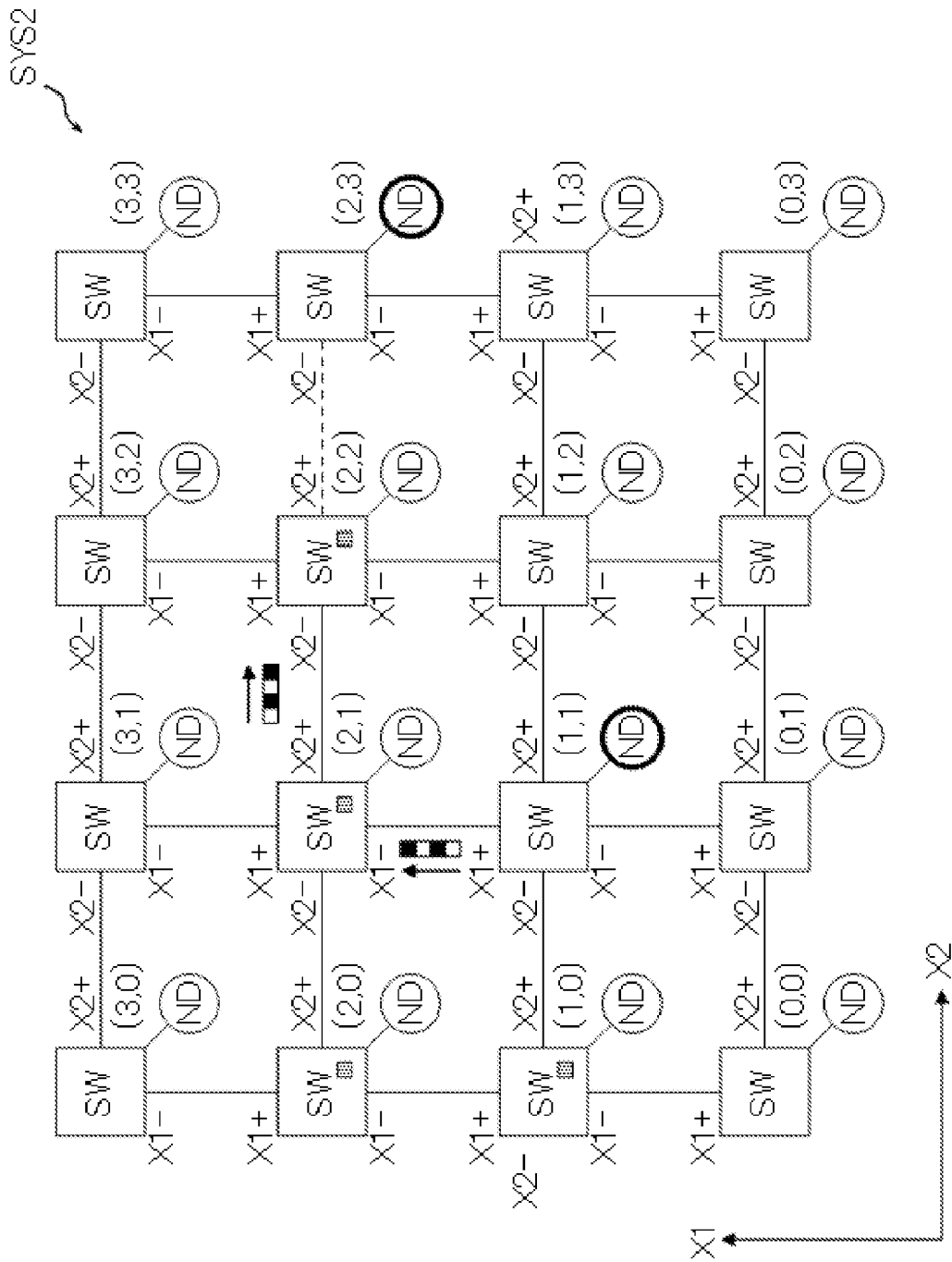
FIG. 10 is a diagram illustrating another example of the transmission of the packet in the information processing system as illustrated in FIG. 2.

FIG. 10 illustrates another example of the transmission of the packet in the information processing system SYS2 as illustrated in FIG. 2. Regarding the same as or similar to the operation illustrated in FIG. 6, the same marks or signs as those of the operation illustrated in FIG. 6 are denoted, and the specific description will not be repeated. FIG. 10 subsequently illustrates the operation illustrated in FIG. 7.

In an example illustrated in FIG. 10, the packet is transmitted to the node ND at the address (2, 3) from the node ND at the address (1, 1) indicated by the thick circle. The switch device SW at the address (1, 1) does not hold the degeneration information FB in the management table 30a of the management unit 30. For this reason, the node ND at the address (1, 1) transmits the packet at the same transmission rate as that of the node ND at the address (1, 0) as illustrated in FIG. 6 without recognizing the occurrence of the lane degeneration. The transmission of the packet is performed in the same way as in FIG. 6.

The switch device SW at the address (2, 2) which is connected to the lane in which the degeneration occurred refers to the management table 30a. Then, the switch device SW at the address (2, 2) detects that the degeneration notification packet is not transmitted to the switch device SW which is connected to the transmission source node ND (the address (1, 1)). In addition, the switch device SW at the address (2, 2) updates the management table 30a and adds the degeneration information FB of "half of the lane degeneration rate, the degeneration address X1=2, X2=2, the degeneration axis X2+, the notification destination address X1=1, and X2=1". The degeneration address is the address of the switch device SW which is connected to the path in which the lane degeneration occurred. The degeneration information FB which is added to the management table 30a is indicated in the second line of the management table 30a in FIG. 5.

FIG. 11 illustrates another example in which the degeneration notification packet is transmitted to a switch device SW in the information processing system SYS2 as illustrated in FIG. 2. Regarding the same as or similar to the operation illustrated in FIG. 7, the same marks or signs as those of the operation illustrated in FIG. 7 are denoted, and the specific description will not be repeated. FIG. 11 subsequently illustrates the operation illustrated in FIG. 10.

The switch device SW at the address (2, 2) which is connected to the lane in which the degeneration occurred transmits the degeneration notification packet including the degeneration information FB toward the transmission source node ND (the address (1, 1)). The switch device SW at the address (2, 2) transmits the degeneration notification packet and then transmits the packet which is transmitted from the node at the address (1, 1) to the path in which the lane is degenerated in the same way in FIG. 7.

In accordance with the rule of the dimension order routine, the degeneration notification packet is sequentially transmitted, in the same way as in FIG. 7, to the switch device SW at the address (2, 1) and the switch device SW at the address (1, 1). The switch device SW which receives the degeneration notification packet updates the management table 30a and adds the degeneration information FB which is included in the degeneration notification packet the same way as the switch device SW at the address (2, 2).

As illustrated in FIG. 7 and FIG. 11, the degeneration notification packet is sequentially transmitted to the switch device SW which is connected to the node ND from which the packet is transmitted. For this reason, the node ND from which the packet is transmitted can insert the gap GAP from the transmission of the next packet, thereby suppressing the occurrence of the congestion.

Figure 12:
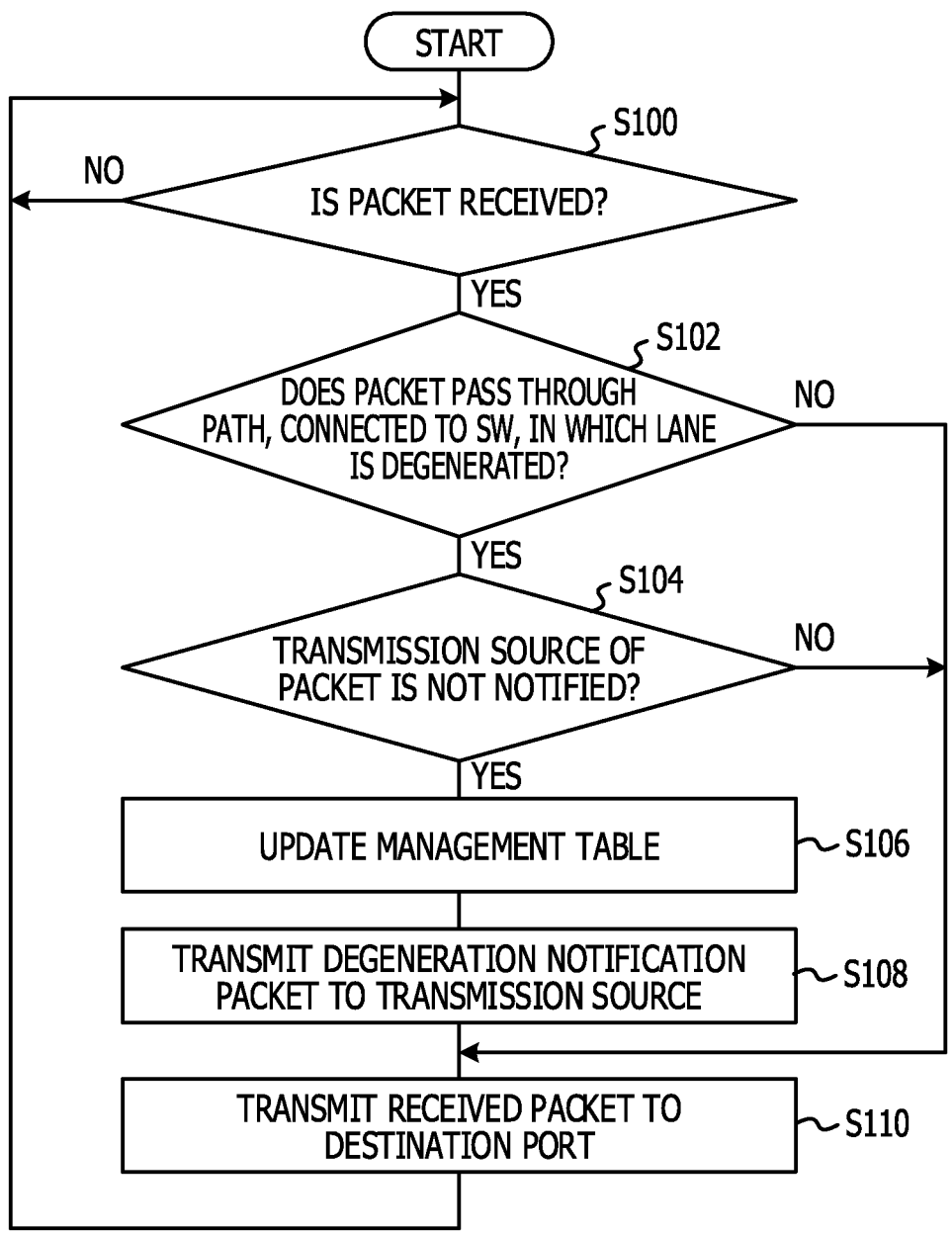
FIG. 12 is a diagram illustrating an example of operation of a port PT1 in the switch device as illustrated in FIG. 3.

FIG. 12 illustrates an example of operation of a port PT1 in the switch device SW as illustrated in FIG. 3. The operation illustrated in FIG. 12 may be realized by hardware in the port PT1 or the program executed by the processor included in the port PT1.

First, in S100, the receiving unit 10a determines whether the packet is received from the adjacent switch devices SW. When the packet is received, the process proceeds to S102. On the other hand, when the packet is not received, the process repeats S100.

In S102, the monitoring unit MON refers to the management table 30a of the management unit 30 as illustrated in FIG. 5 based on the indication from the control unit RCNTa. Then, the monitoring unit MON determines whether the received packet passes through the path, connected to the switch device SW, in which the lane is degenerated. In other words, the monitoring unit MON determines whether the next lane to which the packet is transmitted is currently being degenerated. For example, when both of the following two conditions are satisfied, the monitoring unit MON determines that the received packet passes through the path, connected to the switch device SW, in which the lane is degenerated.

(1) The "address" of the "degeneration position" which is included in the respective items of degeneration information FB held in the management table 30a is the same address as the switch device SW itself.

(2) In response to the above description (1), the "axis" of "degeneration position" which is stored in the management table 30a is the same axis of the port PT1 from which the received packet is transmitted.

When the packet is determined to have passed through the path, connected to the switch device SW, in which the lane is degenerated (Yes in S102), the process proceeds to S104. On the other hand, when the packet is determined not to have passed through the path, connected to the switch device SW, in which the lane is degenerated (No in S102), the process proceeds to S110. Due to the determination in S102, the switch device SW connected to the path in which the lane is degenerated transmits the degeneration notification packet. However, other switch devices SW do not transmit the degeneration notification packet. As a result, it is possible to perform the operation of the transmission as illustrated in FIG. 7 and FIG. 11. Therefore, the node ND which transmits the packet passing through the path in which the lane is degenerated, can insert the gap GAP between the packets.

In S104, the monitoring unit MON determines whether the switch device SW which is connected to the transmission source node ND is notified of the degeneration notification packet. For example, when the address of the transmission source of the packet passing through the degeneration position included in the degeneration information FB indicates the path between "the notification destination address" and "the degeneration position" included in the degeneration information FB, the monitoring unit MON determines that the switch device SW is already notified of the degeneration notification packet. On the other hand, when the address of the transmission source of the packet passing through the degeneration position included in the degeneration information FB indicates a path other than the path between "the notification destination address" and "the degeneration position included in the degeneration information FB, the monitoring unit MON determines that the switch device SW is not notified of the degeneration notification packet.

When it is determined that the switch device SW is not notified of the degeneration notification packet (No in S104), the process proceeds to S110. On the other hand, when it is determined that the switch device SW is notified of the degeneration notification packet (Yes in S104), the process proceeds to S106. An example of determination of whether the switch device SW is notified of the degeneration notification packet is described in FIG. 14, FIG. 15, FIG. 16, FIG. 17, and FIG. 18.

In S106, the monitoring unit MON receives the information indicating the destination of the received packet via the control unit RCNTa. Then, the monitoring unit MON updates the management table 30a by storing the degeneration rate of the lane, the position of the path in which the lane is degenerated, and the address of the node ND which is the transmission source of the packet in the management table 30a of the management unit 30.

Next, in S108, the control unit RCNTa receives the degeneration information FB stored in the management table 30a from the monitoring unit MON. The control unit RCNTa transmits the received degeneration information FB as the degeneration notification via the cross bar switch XBAR to transmission unit 20a in the port PT1. The transmission unit 20a transmits the received degeneration notification packet toward the transmission source node ND.

Next, in S110, the control unit RCNTa transmits the received packet to the transmission unit 20a in the port PT1 other than the port position in the transmission direction of the packet via the cross bar switch XBAR. Then, the packet is transmitted toward the node ND indicated by the destination information included in the packet. After the end of the process in S110, the process returns to S100 again.

In the operation as illustrated in FIG. 12, S104, S106, and S108 are executed by the switch device SW connected to the path in which the lane is degenerated. As illustrated in FIG. 7 and FIG. 11, another switch device SW having received the degeneration notification packet transmits the degeneration notification packet to the adjacent switch device SW.

FIG. 13 illustrates an example of an operation of the gap control unit 74 in the network interface 60 illustrated in FIG. 4.

First, in S200, the gap control unit 74 determines whether the destination address TAD of the packet is received from the gap insertion unit 72. In other words, the gap control unit 74 determines whether the network interface 60 of the node ND transmits the packet. When the address TAD is received, the process proceeds to S202. On the other hand, when the address TAD is not received, the process repeats S200.

In S202, the gap control unit 74 acquires the degeneration information FB from the management table 30a of the switch device SW. Then, the gap control unit 74 determines whether the packet indicated by the address TAD (the destination) passes through the path in which the lane degeneration currently occurs. For example, the monitoring unit MON reads out the respective items of the degeneration information FB held in the management table 30a. In addition, the monitoring unit MON confirms whether the received packet passes through each of the degeneration positions included in the degeneration information FB. When the packet passes through the degeneration position (the path in which the lane degeneration currently occurs) included in the degeneration information FB, the process proceeds to S204. On the other hand, when the packet does not pass through the degeneration position, the process proceeds to S200. An example of determination of whether the packet passes through the path in which the lane degeneration currently occurs is described in FIG. 19, FIG. 20, FIG. 21, and FIG. 22.

In S204, the gap control unit 74 instructs the gap insertion unit 72 to perform the insertion of the gap corresponding to the transmission rate of the packet which is decreased by the occurrence of the lane degeneration. For example, as described in FIG. 4, the gap control unit 74 outputs the insertion indication GINS indicating the insertion of the gap to the gap insertion unit 72 based on "the lane degeneration rate" in the degeneration information FB acquired in S202. After the end of the process in S204, the process returns to S200 again.

Figure 14:
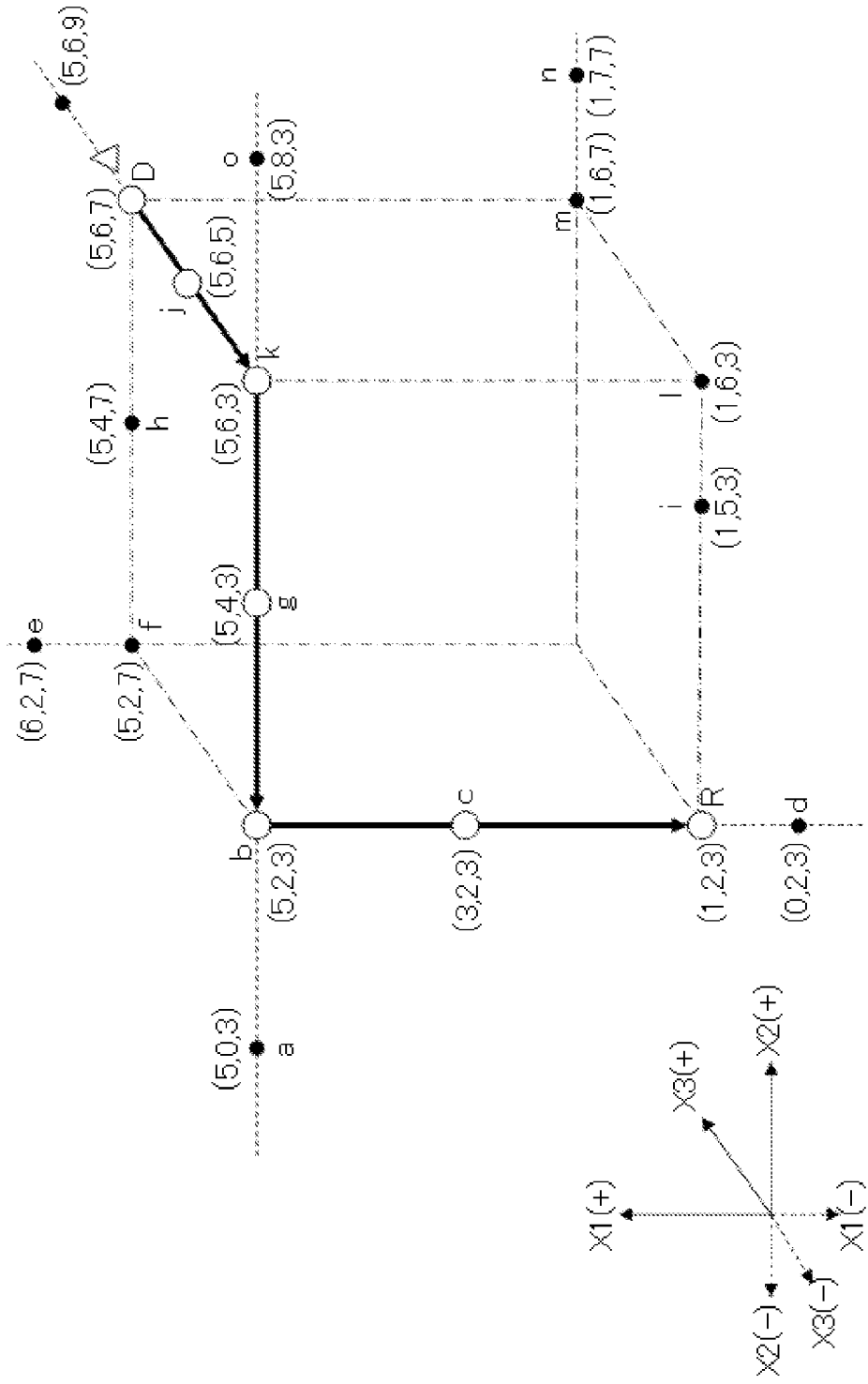
FIG. 14 is a diagram illustrating an example of a method for determining whether a notification of the degeneration notification packet is performed in a three-dimensional network.

FIG. 14 illustrates an example of a method for determining whether a notification of the degeneration notification packet is performed in a three-dimensional network. In FIG. 14, a white circle and a black circle each indicate the switch device SW or the node N on the network. The addresses of the switch device SW and the node N are represented by the values of the axis X1, the axis X2, and the axis X3 (for example (1, 2, and 3)). For the sake of convenience of description, in the description of FIG. 14, the switch device SW and the node N are referred to as the switch device (1, 2, and 3) and the node (1, 2, and 3). A dimension order routine is employed in the network illustrated in FIG. 14; the transmission of the packet in the direction of the address being increased is determined to be performed in order of the axis X1 to the axis X3, and the transmission of the packet in the direction of the address being decreased is determined to be performed in order of the axis X3 to the axis X1.

In the example illustrated in FIG. 14, after the degeneration of the lane has occurred in the switch device (5, 6, and 7) in the + direction (the triangle mark) of the axis X3, the packet is transmitted from the node (1, 2, and 3) to the node (5, 6, and 9). When the switch device (5, 6, and 7), connected to the path in which the lane is degenerated, receives the packet being transmitted in the + direction of the axis X3 after the occurrence of the lane degeneration, the switch device stores the degeneration information FB in the management table 30a as illustrated in FIG. 5. Then, the switch device (5, 6, and 7) notifies the node (1, 2, and 3), which is the transmission source of the packet, of the degeneration notification packet. The degeneration notification packet is sequentially transmitted to the switch device (1, 2, and 3) through the path indicated by a thick arrow. The switch device (5, 6, and 7) connected to the path in which the lane is degenerated is also referred to as the switch device D. The switch device (2, 2, and 2) connected to the node (2, 2, and 2) which is the transmission source of the packet is also referred to as a switch device R.

Each of the switch devices SW which is present above the thick arrow stores the degeneration information FB which is included in the received degeneration notification packet in the management table 30a. The white circle above the thick arrow indicates a portion of the switch device which receives the degeneration notification packet. On the other hand, each of the switch devices which are not present above the thick arrow does not receive the degeneration notification packet and the management table 30a does not hold the degeneration information FB. The black circle illustrated in FIG. 14 indicates a portion of the switch device which has not received the degeneration notification packet.

When the switch device D receives a new packet passing through the path, indicated by the triangle mark, in which the lane is degenerated from the node which is present above the thick arrow, transmission of the degeneration notification packet is not performed. On the other hand, When the switch device D receives a new packet passing through the path, indicated by the triangle mark, in which the lane is degenerated from a node other than the node which is present above the thick arrow, the degeneration notification packet is transmitted to the node which is the transmission source of the packet. Whether the degeneration notification packet is transmitted is determined based on the following conditions.

If (condition 1a), (condition 1b), (condition 1c) and (condition 2) are satisfied, or (condition 1d) and (condition 1e) are satisfied, it is determined that the switch device D has notified the switch device which is the transmission source of the packet address of the degeneration notification packet. On the other hand, if any one of the (condition 1a), the (condition 1b), the (condition 1c), and the (condition 2) is not satisfied, or the (condition 1d) or the (condition 1e) is not satisfied, it is determined that the switch device D has not notified the switch device SW which is the transmission source address of the degeneration notification packet. In the following, the address of the switch device D connected to the path in which the lane is degenerated is referred to as a degeneration address D. The address of the switch device R which is the notification destination of the degeneration notification packet is referred to as a notification destination address R.

The (condition 1) and the (condition 1a): in the address (the transmission source address) of the node which issues a new packet, only one of the values on the axes is different from the value on the axis corresponding to the degeneration address D and the notification destination address R.

The (condition 1b): in the transmission source address, all values on the axes which are before the axis satisfying the above described (condition 1a) in the routine sequence are equivalent to the corresponding values on the axes in the degeneration address D.

The (condition 1c): in the transmission source address, all values on the axes which are after the axis satisfying the above described (condition 1a) in the routine sequence are equivalent to the corresponding values on the axes in the notification destination address R.

The (condition 1d): in the transmission source address, all values on the axes are equivalent to the value of the degeneration address D or the notification destination address R.

(the condition 1e): a value on the axis in the preceding routine sequence is equivalent to the corresponding value of the axis in the degeneration address D and, the value on the axis in the succeeding routine sequence is equivalent to the corresponding value of the axis in the notification destination address R.

(condition 2): the value on the axis satisfying the above described (condition 1a), (condition 1b), and (condition 1c) is present between the corresponding value on the axis in the degeneration address D and the corresponding value on the axis in the notification destination address R.

In the nodes ND which are indicated by the thick arrow and present in the path, the nodes c, g, and j which are not present at the position where the thick arrow is bent satisfy the (condition 1a), the (condition 1b), the (condition 1c), and the (condition 2). The nodes a, d, and o which are present in the path of the extension of the thick arrow satisfy the (condition 1a), the (condition 1b), and the (condition 1c), but do not satisfy the (condition 2). In the nodes ND which are present in the path indicated by the dashed line corresponding to the thick arrow, the nodes i and h which are not present at a corner satisfy the (condition 1a) and the (condition 2), but do not satisfy the (condition 1b) or the (condition 1c). The nodes e and n which are present on the extension of the dashed line corresponding to the thick arrow satisfy the (condition 1a), but do not satisfy the (condition 1b) or the (condition 1c), and the (condition 2).

For example, the value of "3" on the axis X1 of the node c which is present on the thick arrow is different from the value of "5" on the axis X1 of the switch device D and the value of "1" on the axis X1 of the switch device R, and the value of "2" on the axis X2 and the value of "3" on the axis X3 of the node c are equivalent to the values on the axis X2 and the axis X3 of the switch device R. For this reason, the node c satisfies the (condition 1a). Since the axis X2 and the axis X3 succeeding routine sequences of the axis X1 which satisfies the (condition 1a), respectively have the value "2" and the value "3" which are equivalent to the values on the axis X2 and the axis X3 in the notification destination address R, and thus the node c satisfies the (condition 1c). Since the axis preceding routine sequences of the axis X1 which satisfies the (condition 1a) is present, the (condition 1b) is not used in determination. Further, regarding the (condition 2), the value of "3" on the axis X1 in the node c is present between the value of "5" on the axis X1 in the degeneration address D and the value of "1" on the axis X1 in the notification destination address R. Accordingly, the node c satisfies both of the (condition 1) and the (condition 2). The switch device D determines that the switch device (3, 2, and 3) is notified of the degeneration notification packet when having received a new packet which sets the address (5, 6, and 9) as the destination from the node c. In this case, the switch device D does not transmit the degeneration notification packet.

On the other hand, the nodes b and k which are present at the position where the thick arrow is bent satisfy the (condition 1d) and the (condition 1e). In the node ND which is present in the path indicated by the dashed line corresponding to the thick arrow, the nodes f, l, and m which are positioned at the corners satisfy the (condition 1d), but do not satisfy (the condition 1e).

For example, since the value of "7" on the axis X3 is different from the value of "3" on the axis X3 of the notification destination address R, the node f satisfies the (condition 1d) but does not satisfy the condition (1e). Therefore, the switch device D determines that the switch device (5, 2, and 7) is not notified of the degeneration notification packet when having received a packet which sets the address (5, 6, and 9) as the destination from the node f. In this case, the switch device D transmits the degeneration notification packet to the switch device (5, 2, and 7).

In the following, a symbol of beginning with D represents the degeneration address. A symbol of beginning with R represents the notification destination address which is the address of notification destination of the packet. A symbol of beginning with L represents a transmission source address which is the address of the transmission source of a new packet. The numbers with the symbols D, R, and L represent the numbers of axes. A symbol of beginning with S represents the number of the nodes which are connected to each axis.

In an n-dimensional (n is a positive integer) network, if an integer y ($1 \leq y \leq n$) which satisfies Expression (1) is present, the above described (condition 1a), (condition 1b), and (condition 1c), or (condition 1d) and (condition 1e) are satisfied.

$$L1=D1, L2=D2, \ldots, Ly-1=Dy-1, Ly+1=Ry+1, Ly+2=Ry+2, \ldots, Ln=Rn \qquad (1)$$

For example, if the integer y is "1" and, L2=R2, L3=R3, . . . , Ln=Rn, the above described (condition 1) is satisfied. For example, in a two-dimensional (n=2) network, if L1=D1 (y becomes "1") or L2=R2 (y becomes "2") is satisfied, and (condition 1) is satisfied.

In addition, in a mesh-type network topology, if Expression (2) or Expression (3) is satisfied, the (condition 2) is satisfied.

$$Ry \leq Ly \leq Dy \qquad (2)$$

$$Dy \leq Ly \leq Ry \qquad (3)$$

In a torus-type network topology, if Expressions (4) and (2) or Expressions (4) and (3) are satisfied, the (condition 2) is satisfied. Alternatively, in the torus-type network topology, if Expressions (5), and (6) or Expressions (5) and (7) are satisfied, the (condition 2) is satisfied.

$$|Ry-Dy| \leq Sy-|Ry-Dy| \qquad (4)$$

$$|Ry-Dy| > Sy-|Ry-Dy| \qquad (5)$$

$$Ly \leq Ry \leq Dy \qquad (6)$$

$$Ry \leq Dy \leq Ly \qquad (7)$$

Figure 15:
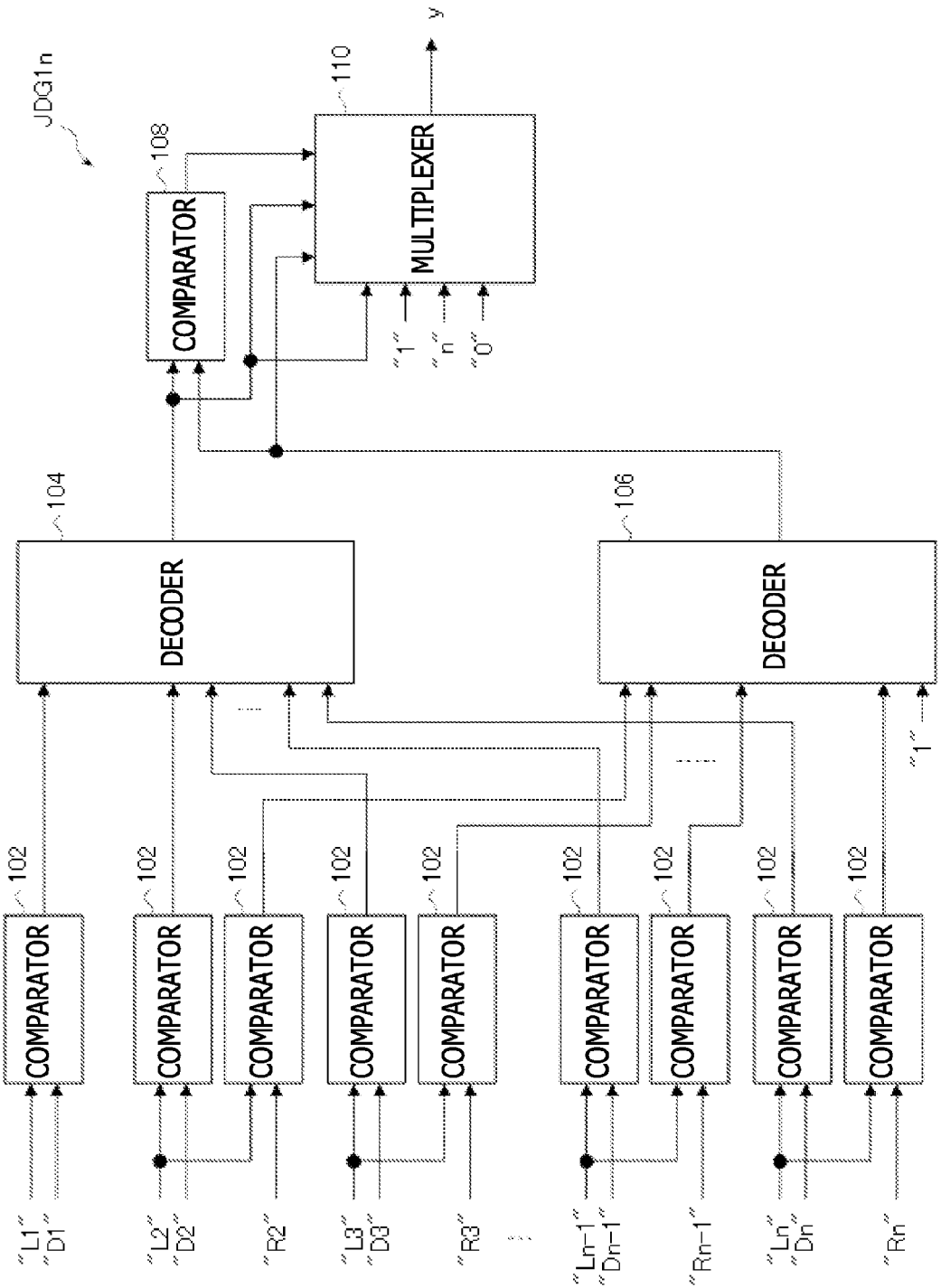
FIG. 15 is a diagram illustrating an example of a first determination unit provided in a monitoring unit as illustrated in FIG. 3.

FIG. 15 illustrates an example of a first determination unit provided in a monitoring unit MON as illustrated in FIG. 3. A first determination unit JDG1n illustrated in FIG. 15 determines whether the address of the transmission source of the packet (the condition 1) is satisfied in the n-dimensional (n is an integer equal to or greater than 3) network.

The first determination unit JDG1n includes a plurality of comparators 102, a pair of the decoders 104 and 106, a comparator 108, and a multiplexer 110. Regarding the axis X1 to the axis Xn (n is an integer equal to or greater than 3) of the addresses of the transmission source of the packet, each of the comparators 102 compares the transmission source address Ln and the degeneration address Dn. Each of the comparators 102, regarding axis X2 to axis Xn, compares the transmission source node address Ln and the notification destination address Rn. If the comparison result is coincident, the comparators 102 output "1", and if the comparison result is not coincident, the comparators 102 output "0".

The decoder 104 compares the comparison result between the transmission source address Ln and the degeneration address Dn in the ascending order, and outputs the number of the axis which is not coincident (="0"), determined for the first time. The decoder 106 compares the comparison result between the transmission source address Ln and the notification destination address Rn in the descending order, and outputs the number of the axis which is not coincident (="0"), determined for the first time. The decoder 106 inputs "1" at last so as to match the bit width of the input of the decoder 104. If all input bits are "1", each of the decoders 104 and 106 outputs "0".

The comparator 108 outputs the value of "1" if the output value from the decoders 104 and 106 is coincident, and the comparator 108 outputs the value of "0" if the output value is not coincident. The multiplexer 110 outputs the output value (the number of axis) obtained from the detector 104 as the axis y if the output of the comparator 108 is "1". In other words, if the output of the comparator 102 is the same value as the number of the axis which is not coincident, the determination circuit JGD1n determines that the axis y satisfying the (condition 1) is present. If the number of the axis "n−1" is output from the decoder 104, the multiplexer 110 determines that the (condition 1) is satisfied in the axis X1, and outputs "1" as the axis y. If the number of the axis "0" is output from the decoder 106, the multiplexer 110 determines that the (condition 1) is satisfied in the n-axis, and outputs the number of axis "n" as the axis y. In other cases, the multiplexer 110 determines that the (condition 1) is not satisfied, and outputs the value of "0" as the axis y.

Figure 16:
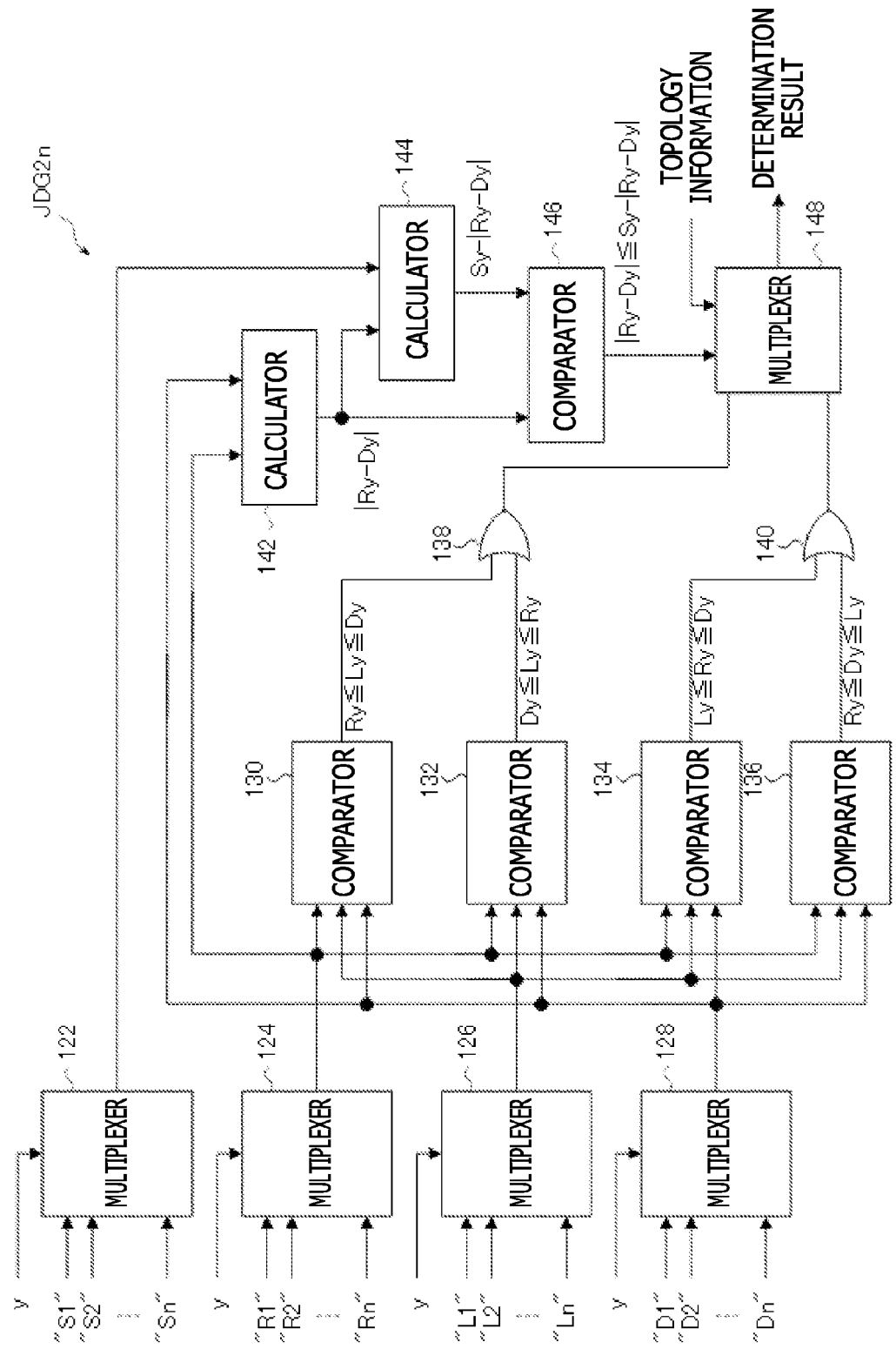
FIG. 16 is a diagram illustrating an example of a second determination unit provided in the monitoring unit as illustrated in FIG. 3.

FIG. 16 illustrates an example of a second determination unit provided in the monitoring unit MON as illustrated in FIG. 3. A second determination unit JDG2n illustrates in FIG. 16 determines the (condition 2) in the n-dimensional (n is an integer equal to or greater than 3) network. The second determination unit JDG2n operates by using the value of the axis y obtained from the determination of the first determination unit JDG1n as illustrated in FIG. 15. For this reason, if the determination result which is output from the second determination unit JDG2n "1", the transmission source address which is input to the first determination unit JDG1n satisfies the (condition 1) and the (condition 2). That is, if the determination result "1", it is determined that the switch circuit SW, to which the transmission source address input to the first determination unit JDG1n is assigned, is already notified of the degeneration notification packet. On the other hand, if the determination result is "0", it is determined that the switch circuit SW, to which the transmission source address input to the first determination unit JDG1n is assigned, is not notified of the degeneration notification packet.

The second determination unit JDG2n includes multiplexers 122, 124, 126, and 128, comparators 130, 132, 134, and 136, OR gates 138 and 140, calculators 142 and 144, a comparator 146 and a multiplexer 148.

Figure 19:
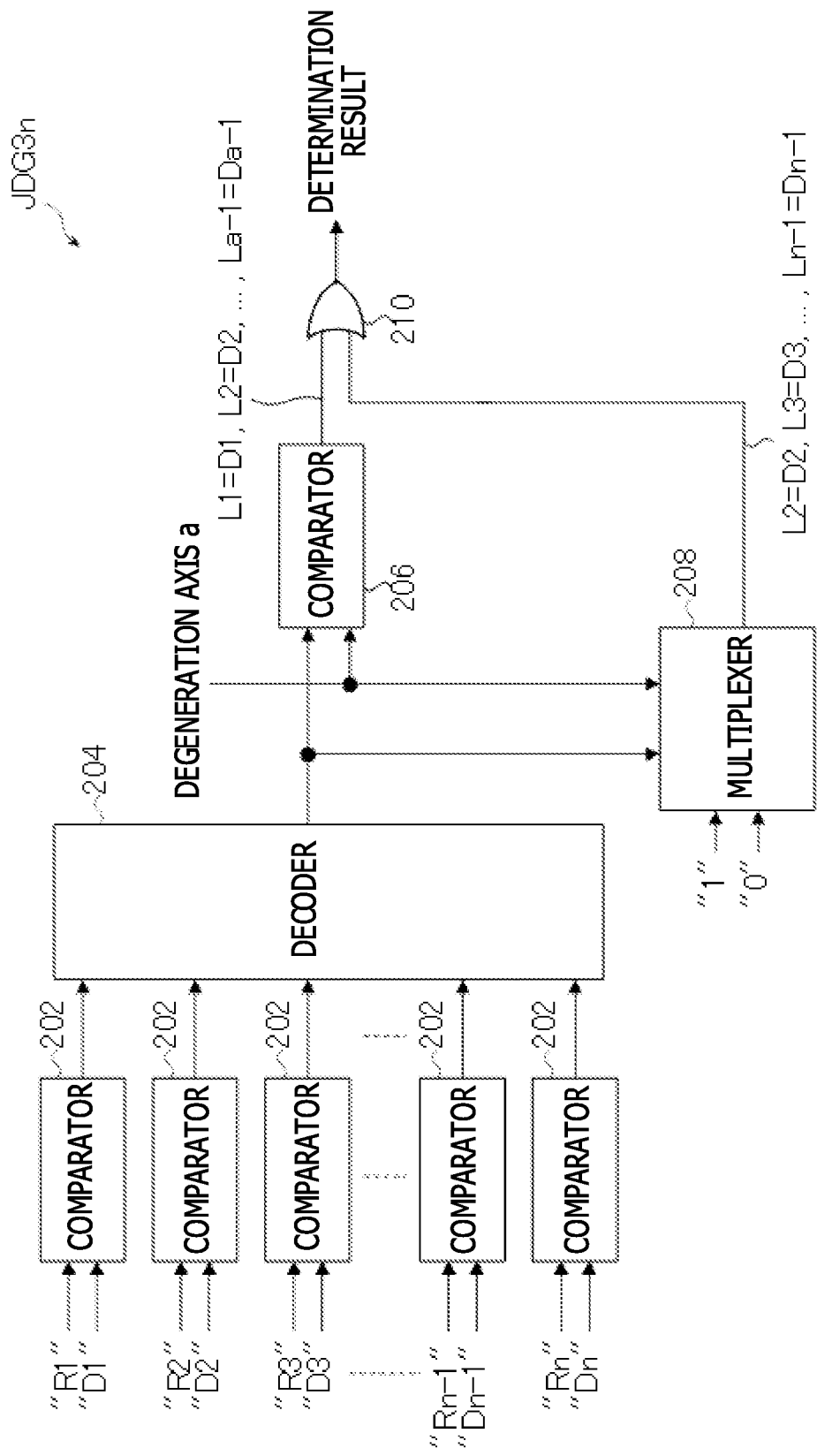
FIG. 19 is a diagram illustrating an example of a third determination unit provided in the network interface as illustrated in FIG. 4.

The multiplexer 122 selects a number S of the node ND which is present on the axis y calculated in FIG. 19 and outputs the selected number. The multiplexer 124 selects the value of axis y calculated in FIG. 19 in the notification destination address R and outputs the selected value of the axis y. The multiplexer 126 selects the value of axis y calculated in FIG. 19 in the transmission source address L and outputs the selected value of the axis y. The multiplexer 128 selects the value of axis y calculated in FIG. 19 in the degeneration address D and outputs the selected value of the axis y.

If Expression (2) is satisfied, the comparator 130 outputs the value of "1" and if Expression (2) is not satisfied, the comparator 130 outputs the value of "0" based on the output values of the multiplexers 124, 126, and 128. If Expression (3) is satisfied, the comparator 132 outputs the value of "1" and if Expression (3) is not satisfied, the comparator 132 outputs the value of "0" based on the output values of the multiplexers 124, 126, and 128. If Expression (6) is satisfied, the comparator 134 outputs the value of "1" and if Expression (6) is not satisfied, the comparator 134 outputs the value of "0" based on the output values of the multiplexers 124, 126, and 128. If Expression (7) is satisfied, the comparator 136 outputs the value of "1" and if Expression (7) is not satisfied, the comparator 136 outputs the value of "0" based on the output values of the multiplexers 124, 126, and 128.

If Expression (2) or Expression (3) is satisfied, the OR gate 138 outputs the value of "1". If Expression (6) or Expression (7) is satisfied, the OR gate 140 outputs the value of "1". The calculator 142 calculates |Ry−Dy| from the output of the multiplexers 124 and 128. The calculator 144 calculates Sy−|Ry−Dy| from the output of the multiplexer 122 and the output of the calculator 142. If Expression (4) is satisfied, the comparator 146 outputs the value of "1" and if Expression (6) is satisfied (in other words, Expression (4) is not satisfied), the comparator 146 outputs the value of "0" based on the outputs of the calculators 142 and 144. The multiplexer 148 receives outputs of the OR gates 138, 140, and 141, the comparison result of the comparator 146, and topology information indicating the network topology, and outputs the determination result. The topology information indicates that the network is in the mesh type or the torus type.

For example, if the network topology is in the mesh type, the multiplexer 148 outputs the output of the OR gate 138 as the determination result (the determination result of Expression (2) or Expression (3)). If the network topology is in the torus type and the comparator 146 outputs the value of "1", the multiplexer 148 outputs the output of the OR gate 138 as the determination result (the determination result of Expressions (4) and (2), or Expressions (4) and (3)). If the network topology is in the torus type and the comparator 146 outputs "0", the multiplexer 148 outputs the output of the OR gate 140 as the determination result (the determination result Expressions (5) and (6), or Expressions (5) and (7)).

From the above, if the second determination unit JDG2n outputs the determination result of "1", the monitoring unit MON determines that the switch circuit SW which is the transmission source of the packet is already notified of the degeneration notification packet. If the second determination unit JDG2n outputs the determination result of "0", the monitoring unit MON determines that the switch circuit SW which is the transmission source of the packet is not notified of the degeneration notification packet.

Figure 17:
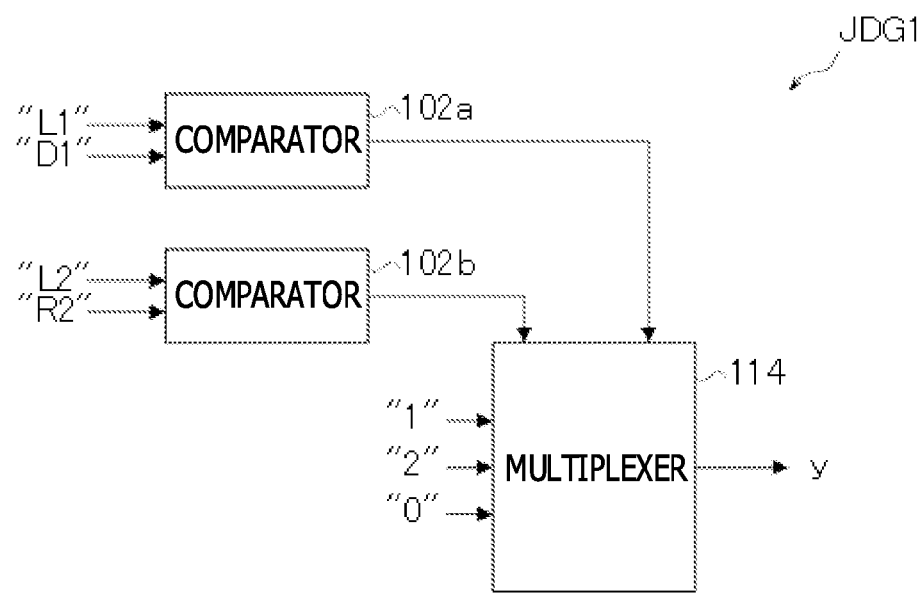
FIG. 17 is a diagram illustrating another example of the first determination unit provided in the monitoring unit as illustrated in FIG. 3.

FIG. 17 illustrates another example of a first determination unit provided in the monitoring unit MON as illustrated in FIG. 3. The first determination unit JDG1 illustrated in FIG. 17 determines whether the address of the transmission source of the packet satisfies the (condition 1) in the two-dimensional network.

The first determination unit JDG1 includes a comparator 102a comparing a transmission source address L1 and a degeneration address D1, a comparator 102*b* comparing a transmission source address L2 and a notification destination address R2, and a multiplexer 114. If the comparator 102*a* is coincident, the multiplexer 114 outputs "2" as the axis y, if the comparator 102*b* is coincident, the multiplexer 114 outputs the value of "1" as the axis y, and in other cases, the multiplexer 114 outputs the value of "0" as the axis y. If the value of the axis y is "1" or "2", the (condition 1) is satisfied as described in FIG. 14.

For example, in FIG. 9, if the packet is transmitted from the node ND at the address (2, 1) to the node ND at the address (2, 3), the transmission source address L1 and the degeneration address D1 are equivalent to each other, and thus an address value of "2" is output as the axis y. If the packet is transmitted from the node ND at the address (1, 1) to the node ND at the address (2, 3), since the transmission source address L1 and the degeneration address D1 are different from each other, and the transmission source address L2 and the notification destination address R1 are different from each other, thereby outputting "0" as the axis y.

Figure 18:
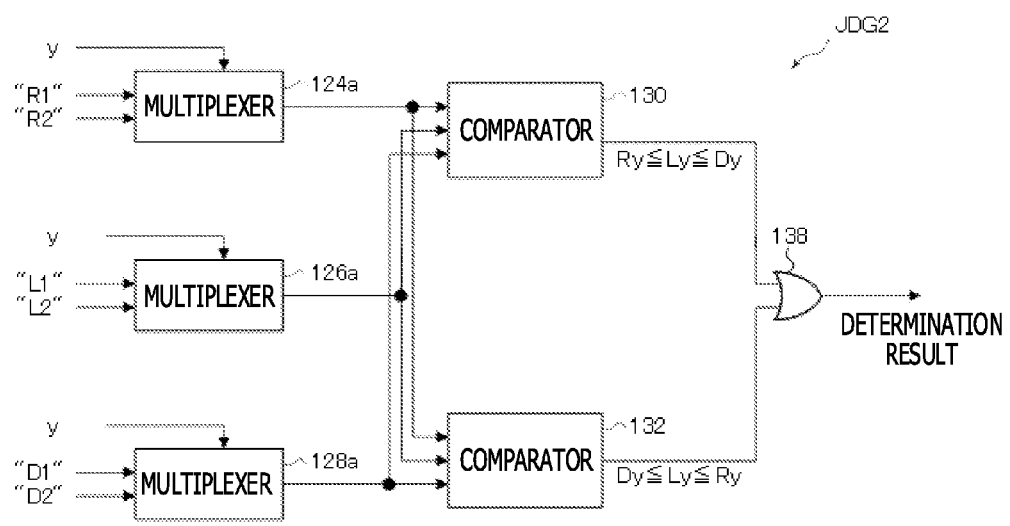
FIG. 18 is a diagram illustrating another example of the second determination unit provided in the monitoring unit as illustrated in FIG. 3.

FIG. 18 illustrates another example of the second determination unit provided in the monitoring unit MON as illustrated in FIG. 3. The second determination unit JDG2 illustrated in FIG. 18 determines the (condition 2) in the two-dimensional network. Regarding the same as or similar to the operation illustrated in FIG. 16, the same marks or signs as those of the operation illustrated in FIG. 16 are denoted, and the specific description will not be repeated. The second determination unit JDG2 operates based on the value of the axis y obtained from the determination the first determination unit JDG1 illustrates in FIG. 17. The second determination unit JDG2 includes multiplexers 124*a*, 126*a*, and 128*a*, comparators 130 and 132 and an OR gate 138.

Similar to the multiplexers 124, 126, and 128 illustrated in FIG. 16, the multiplexers 124*a*, 126*a*, and 128*a* each output the value of y in the notification destination address R, the transmission source address L, and the degeneration address D. The comparator 130 and 132, and the OR gate 138 operate similar to those in FIG. 16.

For example, in FIG. 9, the packet is transmitted from the node ND at the address (2, 1) to the node ND at the address (2, 3), and the address value of "2" is output from the first determination unit JDG1 illustrated in FIG. 17 as the axis y. In this case, the comparator 130 determines that $Ry \leq Ly \leq Dy$ is satisfied and the value of "1" is output as the determination result. In other words, the monitoring unit MON determines that the degeneration notification packet is already transmitted to the switch circuit SW at the address (2, 1).

In FIG. 10, the packet is transmitted from the node ND at the address (1, 1) to the node ND at the address (2, 3), and the address value of "0" is output from the first determination unit JDG1 illustrated in FIG. 17 as the axis y. In this case, since the determination by the comparators 130 and 132 is not established, the value of "0" is output as the determination result. In other words, the monitoring unit MON determines that the degeneration notification packet is not transmitted to the switch circuit SW at the address (1, 1).

Next, the network interface 60 illustrated in FIG. 4 indicates conditions determining whether or the packet to be transmitted passes through the path in which the lane degeneration occurred. In a case of the n-dimensional network, the number of the axis on which the lane degeneration occurred is assumed to be "a", if any one of the following conditions of (condition 3) and (condition 4) to (condition 9) is satisfied, it is determined that that the packet passes through the path in which the lane degeneration occurred.

The symbol of beginning with D represents the degeneration address. The symbol of beginning with R represents the address of notification destination of the packet. The symbol of beginning with L represents the address of the transmission source of a new packet. The symbol of beginning with S represents the number of the nodes which are connected to each axis.

(condition 3): R1=D1, R2=D2, . . . , and Ra−1=Da−1 (a≥2), or, R2=D2, R3=D3, . . . , and Rn=Dn (a=1) are satisfied.

(condition 4): if the topology network is in the mesh type and the lane degeneration occurred in the + direction of the axis, La≤Da<Ra, or, Ra≤Da<La is satisfied, the packet passes through the path in which the lane is degenerated.

(condition 5): if the topology network is in the mesh type and the lane degeneration occurred in the − direction of the axis, La≤Da<Ra, or, Ra≤Da<La is satisfied, the packet passes through the path in which the lane is degenerated.

(condition 6): if the topology the network is in the torus type and |Ra−La|≤Sa−|Ra−La| is satisfied and the lane degeneration occurred in the + direction of the axis, La≤Da<Ra, or Ra≤Da<La is satisfied, the packet passes through the path in which the lane degeneration occurred.

(condition 7): if the topology the network is in the torus type and |Ra−La|≤Sa−|Ra−La| is satisfied and the lane degeneration occurred in the − direction of the axis, La<Da≤Ra, or Ra<Da≤La is satisfied, the packet passes through the path in which the lane degeneration occurred.

(condition 8): if the topology the network is in the torus type and |Ra−La|>S−|Ra−La| is satisfied and the lane degeneration occurred in the + direction of the axis, Da<La<Ra, or Ra<La≤Da is satisfied, the packet passes through the path in which the lane degeneration occurred.

(condition 9): if the topology the network is in the torus type and |Ra−La|>Sa−|Ra−La| is satisfied and the lane degeneration occurred in the − direction of the axis, Da≤La<Ra, or Ra<La<Da is satisfied, the packet passes through the path in which the lane degeneration occurred.

FIG. 19 illustrates an example of a third determination unit provided in the network interface 60 as illustrated in FIG. 4. A third determination unit JDG3n illustrated in FIG. 19 determines whether the address of notification destination of the packet satisfies the (condition 3) in the n-dimensional network. For example, the third determination unit JDG3n is provided in the gap control unit 74 of the transmission unit 70 illustrated in FIG. 4.

The third determination unit JDG3n includes a plurality of comparators 202, a decoder 204, a comparator 206, a multiplexer 208, and an OR gate 210. If each value on the axis of the notification destination address R and each axis of the degeneration address D are coincident with each other, each of the comparators 202 outputs the value of "1" and if the axes are not coincident with each other, the comparator 202 outputs "0". The decoder 204 refers to the comparison result between each value on the axis of the notification destination address R and each axis of the degeneration address D in the ascending order of the number of axis. Then, the decoder 204 outputs the number of the axis which is not coincident (="0"), determined for the first time. If all of the comparators 202 output the value of "1", the decoder 204 outputs the value of "0".

The comparator 206 is used in determining a case where the degeneration axis a on which the lane degeneration occurred is "2" or greater. If the number of axis which is output from the decoder 204 is coincident with the degeneration axis a, the comparator 206 determines that "L1=D1, L2=D2, . . . , La−1=Da−1" is satisfied and outputs a value of "1". On the other hand, if the number of axis is not coincident with the degeneration axis a, the comparator 206 outputs the value of "0". The multiplexer 208 is used in determining a case where the degeneration axis a is "1". If the output of the decoder 204 is "0" and the degeneration axis a is "1", the multiplexer 208 determines that "L2=D2, L3=D3, . . . , Ln−1=Dn−1" is satisfied and outputs the value of "1", and in other cases, the multiplexer 208 outputs the value of "0".

If the output of the comparator 206 or the multiplexer 208 is "1", the OR gate 210 outputs the value "1" as the determination result. In other words, the third determination unit JDG3n outputs the value of "1" if the (condition 3) of "L1=D1, L2=D2, . . . , La−1=Da−1" or "L2=D2, L3=D3, . . . , Ln−1=Dn−1" is satisfied.

Figure 20:
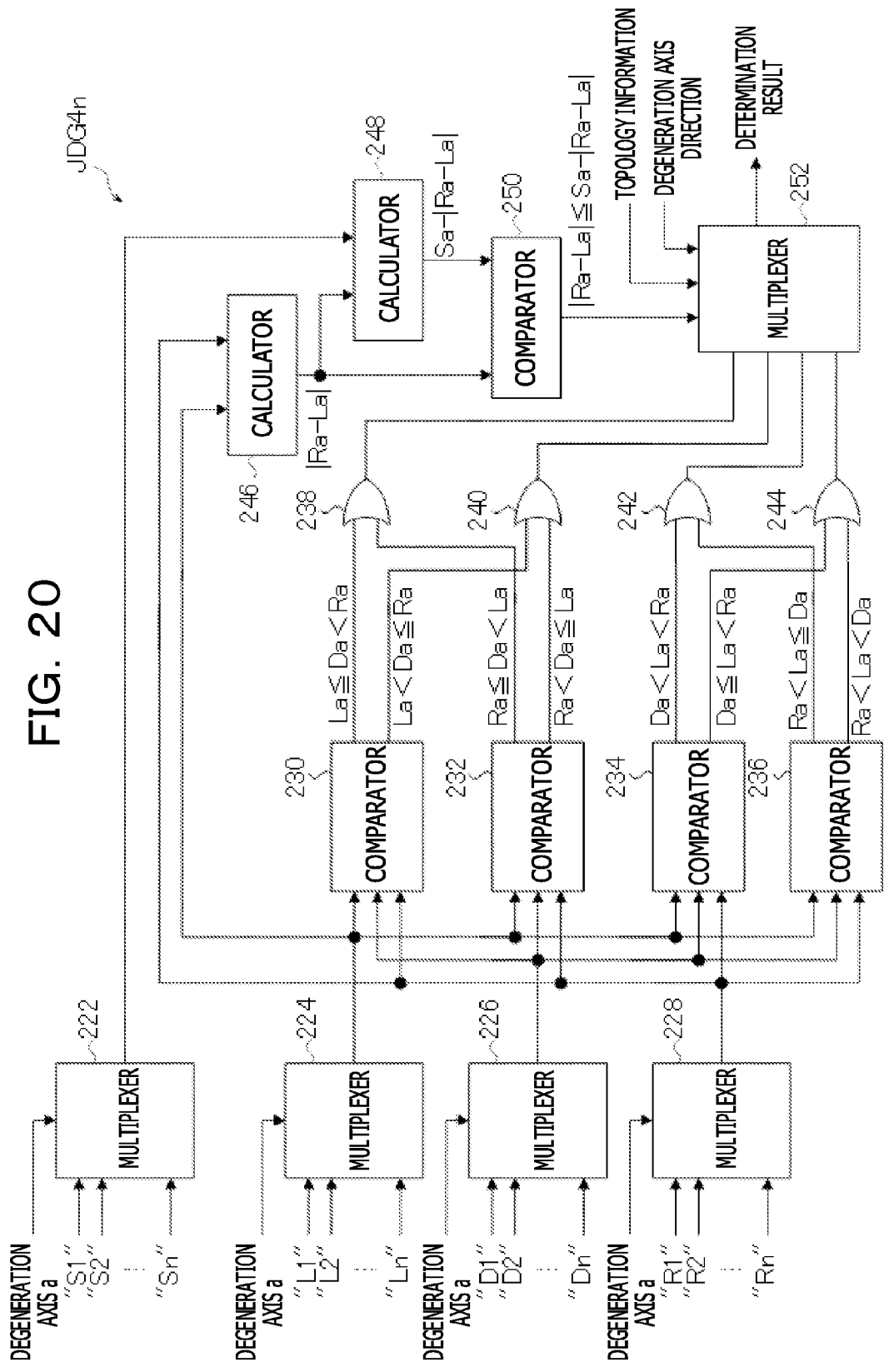
FIG. 20 is a diagram illustrating an example of a fourth determination unit provided in the network interface as illustrated in FIG. 4.
Figure 22:
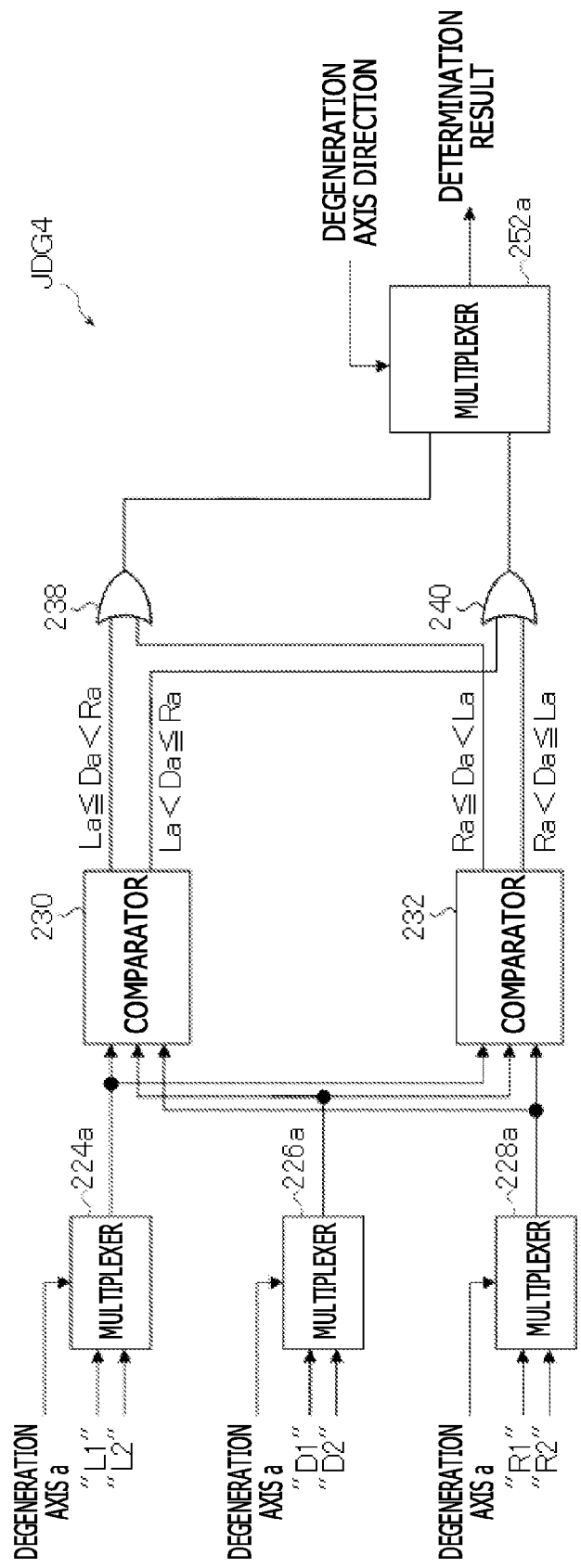
FIG. 22 is a diagram illustrating another example of the fourth determination unit provided in the network interface as illustrated in FIG. 4.

FIG. 20 illustrates an example of a fourth determination unit provided in the network interface 60 as illustrated in FIG. 4. For example, the fourth determination JDG4n illustrated in FIG. 20 is provided in the gap control unit 74 of the transmission unit 70 illustrated in FIG. 4. Then, the fourth determination JDG4n determines whether any one of the above described conditions of (condition 4), (condition 5), (condition 6), (condition 7), (condition 8), and (condition 9) is satisfied in the n-dimensional network. In FIG. 20 and FIG. 22, the symbol of beginning with L represents the transmission source address which is the address of the transmission source of the packet.

The fourth determination JDG4n includes multiplexers 222, 224, 226, and 228, comparators 230, 232, 234, and 236, OR gates 238, 240, 242, and 244, calculators 246 and 248, a comparator 250, and a multiplexer 252.

The multiplexer 222 selects the number S of the node of the degeneration axis a and outputs the selected number. The multiplexer 224 selects the value of the degeneration axis a in the notification destination address R and outputs the selected value of the degeneration axis a. The multiplexer 226 selects the value of the degeneration axis a in the transmission source address L and outputs the selected value of the degeneration axis a. The multiplexer 228 selects the value of the degeneration axis a in the degeneration address D and outputs the selected value of the degeneration axis a.

If La≤Da<Ra or La<Da≤Ra is satisfied, the comparator 230 outputs the value of "1" to a corresponding output terminal and if La≤Da<Ra or La<Da≤Ra is not satisfied, the comparator 230 outputs the value of "0" to the corresponding output terminal based on the output values of the multiplexers 224, 226, and 228. If Ra≤Da<La or Ra<Da≤La is satisfied, the comparator 232 outputs the value of "1" to a corresponding output terminal and if Ra≤Da<La or Ra<Da≤La is not satisfied, the comparator 232 outputs the value of "0" to the corresponding output terminal based on the output values of the multiplexers 224, 226, and 228.

If Da<La<Ra or Da≤La<Ra is satisfied, the comparator 234 outputs the value of "1" to a corresponding output terminal and if Da<La<Ra or Da≤La<Ra is not satisfied, the comparator 234 outputs the value of "0" to the corresponding output terminal based on the output values of the multiplexers 224, 226, and 228. If Ra<La≤Da or Ra<La<Da is satisfied, the comparator 236 outputs the value of "1" to a corresponding output terminal and if Ra<La≤Da or Ra<La<Da is not satisfied, the comparator 236 outputs the value of "0" to the corresponding output terminal based on the output values of the multiplexers 224, 226, and 228.

The calculator 246 calculates |Ra−La| from the outputs of the multiplexers 224 and 228. The calculator 248 calculates Sa−|Ra−Da| from the output of the multiplexer 222 and the output of the calculator 246. If |Ra−Da|≤Sa−|Ra−Da| is satisfied, the comparator 250 outputs the value of "1" and if |Ra−Da|≤Sa−|Ra−Da| is not satisfied, the comparator 250 outputs the value of "0" based on the outputs of the calculators 246 and 248. The multiplexer 252 receives outputs of the OR gates 238, 240, 242, and 244, the comparison result of the comparator 250, topology information indicating the network topology, and the degeneration direction of the axis, and outputs the determination result.

If any one of the (condition 4) to the (condition 9) is satisfied, the multiplexer 252 outputs the value of "1" as the determination result based on the outputs of the OR gates 238, 240, 242, and 244, and the comparator 250, the topology information, and the degeneration direction of the axis. If the (condition 4) to the (condition 9) are not satisfied the multiplexer 252 outputs the value of "0" as the determination result.

For example, the topology network is in the mesh type and the degeneration direction of the axis is "+", the multiplexer 252 outputs the output of the OR gate 238 as the determination result (the determination result of the condition (4)). The topology network is in the mesh type and the degeneration direction of the axis is "−", the multiplexer 252 outputs the output of the OR gate 240 as the determination result (the determination result of the condition (5)).

If the topology network is in the torus type, the comparator 250 outputs the value of "1", and the degeneration direction of the axis is "+", the multiplexer 252 outputs the output of the OR gate 238 as the determination result (the determination result of the condition (6)). If the topology network is in the torus type, the comparator 250 outputs the value of "1", and the degeneration direction of the axis is "−", the multiplexer 252 outputs the output of the OR gate 238 as the determination result (the determination result of the condition (7)).

If the topology network is in the torus type, the comparator 250 outputs the value of "0", and the degeneration direction of the axis is "+", the multiplexer 252 outputs the output of the OR gate 242 as the determination result (the determination result of the condition (8)). If the topology network is in the torus type, the comparator 250 outputs the value of "0", and the degeneration direction of the axis is "−", the multiplexer 252 outputs the output of the OR gate 244 as the determination result (the determination result of the condition (9)).

From the above, if the determination result of both of the third determination unit JDG3n and the fourth determination JDG4n is "1", the gap control unit 74 determines that the packet passes through the path in which the lane degeneration occurred. Then, the gap control unit 74 instructs the insertion unit 72 to insert the gap GAP between the packets. On the other hand, if the determination result of either of the third determination unit JDG3n and the fourth determination JDG4n is "0", the gap control unit 74 determines that the packet does not pass through the path in which the lane degeneration occurred. Then, the gap control unit 74 does not instruct the insertion unit 72 to insert the gap GAP between the packets.

Figure 21:
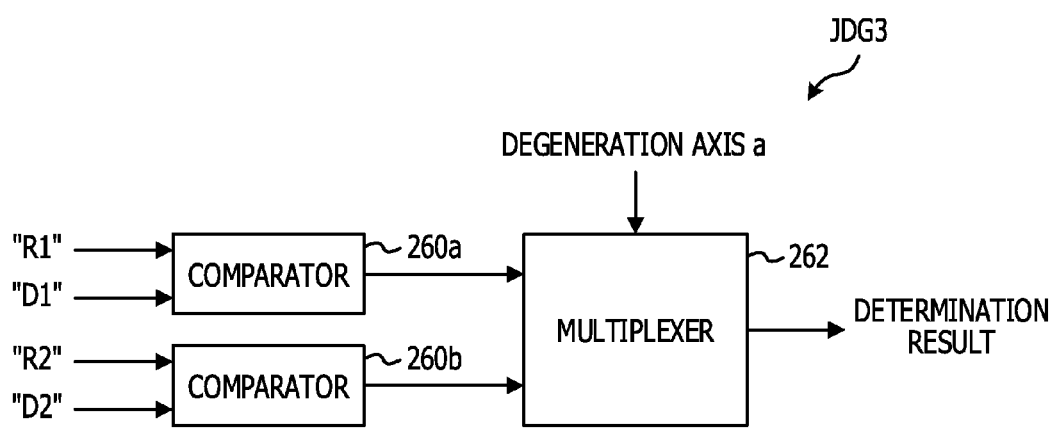
FIG. 21 is a diagram illustrating another example of the third determination unit provided in the network interface as illustrated in FIG. 4.

FIG. 21 illustrates another example of the third determination unit provided in the network interface 60 as illustrated in FIG. 4. The third determination unit JDG3 illustrated in FIG. 21 determines whether the address of notification destination of the packet satisfies the (condition 3) in the two-dimensional network. For example, the third determination unit JDG3 is provided in the gap control unit 74 of the transmission unit 70 illustrated in FIG. 4.

The third determination unit JDG3 includes comparator 260a comparing the notification destination address R1 and the degeneration address D1, a comparator 260b comparing the notification destination address R2 and the degeneration address D2, and a multiplexer 262. If the degeneration axis a is "2", the multiplexer 262 outputs the output of the comparator 260a as the determination result output. On the other hand, If the degeneration axis a is "1", the multiplexer 262 outputs the output of the comparator 260b as the determination result output For example, as illustrated in FIG. 2, in a case where the network is formed in the two-dimensional and is in the mesh type, if the number of the degeneration axis is "2", the determination result becomes "1" based on the (condition 3) when the notification destination address R1 and the degeneration address D1 are equivalent to each other. If the number of the degeneration axis is "1", the determination result becomes "1" when the notification destination addresses R2 and the degeneration address D2 are equivalent to each other.

For example, in FIG. 9, the lane degeneration occurred on the axis X2 (address (2, 2) in the + direction of the axis X2) and the packet is transmitted from the node ND at the address (2, 1) to the node ND at the address (2, 3). In this case, since the comparator 260a output the value of "1" since the notification destination address R1 (=2) and the degeneration address D1 (=2) are equivalent to each other. Then, the comparator 260b outputs the value of "0" since the notification destination address R2 (=3) and the degeneration address D1 (=2) are different from each other. The multiplexer 262 outputs the value of "1" output from the comparator 260a corresponding to the axis X2 which is the degeneration axis a, as the determination result.

On the other hand, in FIG. 9, for example, if the packet is transmitted from the node ND at the address (2, 1) to the node at the address (3, 3) ND, the notification destination address R1 (=3) ant the degeneration address D1 (=2) are different from each other. The notification destination address R2 (=3) and the degeneration address D1 (=2) are different from each other. The multiplexer 262 outputs the value of "0" output from the comparator 260a corresponding to the axis X2 which is the degeneration axis a, as the determination result.

FIG. 22 illustrates another example of the fourth determination unit provided in the network interface 60 as illustrated in FIG. 4. Regarding the same as or similar to the operation illustrated in FIG. 20, the same marks or signs as those of the operation illustrated in FIG. 20 are denoted, and the specific description will not be repeated. The fourth determination JDG4 illustrated in FIG. 22 determines whether the address of notification destination of the packet satisfies the (condition 4) or the (condition 5) in the two-dimensional network (in the mesh type). For example, the fourth determination unit JDG4 illustrated in FIG. 22 is provided in the gap control unit 74 of the transmission unit 70 illustrated in FIG. 4. The fourth determination JDG4 includes multiplexers 224a, 226a, and 228a, comparators 230 and 232, OR gates 238 and 240, and a multiplexer 252a.

Similar to the multiplexers 224, 226 and 228 illustrated in FIG. 20, the multiplexers 224a, 226a, and 228a each select the value of the degeneration axis a and output the selected value in the transmission source address L, the degeneration address D, and the notification destination address R. The comparator 230 and 232, and the OR gates 238 and 240 operate similar to those in FIG. 20.

If the degeneration direction of the axis, which indicates the direction of the axis in which the lane degeneration occurred is "+", the multiplexer 252a outputs the output of the OR gate 238 as the determination result. On the other hand, If the degeneration direction of the axis, which indicates the direction of the axis in which the lane degeneration occurred is "−", the multiplexer 252a outputs the output of the OR gate 240 as the determination result.

For example, in FIG. 9, the lane degeneration occurred on the axis X2 (address (2, 2) in the + direction of the axis X2) and the packet is transmitted from the node ND at the address (2, 1) to the node ND at the address (2, 3). Since the degeneration axis a is "2", each of the comparators 230 and 232 compare the transmission source address L2 (=1), the degeneration address D1 (=2), and the notification destination address R2 (=3) which are output from the multiplexers 224a, 226a, and 228a. Since La≤Da<Ra and La<Da≤Ra is satisfied, the output terminal, the comparator 230 outputs the value of "1" from each of the output terminals. Since Ra≤Da<La and Ra<Da≤La are not satisfied, the comparator 232 outputs the value of "0" from each of the output terminals. Since the degeneration axis a is "2", the multiplexer 252a outputs the output (=1) from the OR gate 238 as the determination result. That is, in FIG. 9, the determination result of the third determination unit JDG3 (FIG. 21) and the determination result of the fourth determination JDG4 are established. For this reason, it is determined that the packet is transmitted from the node ND at the address (2, 1) to the node ND at the address (2, 3) passes through the path in which the lane degeneration occurred. In this case, the gap control unit 74 instructs the insertion unit 72 to insert the gap GAP between the packets.

On the other hand, in FIG. 9, for example, if the packet is transmitted from the node ND at the address (1, 0) to the node ND at the address (2, 1), any one of La≤Da<Ra, La<Da≤Ra, Ra≤Da<La, and Ra<Da≤La is not satisfied. For this reason, each of the comparators 230, 232 outputs the value of "0" from the each output. Then, the multiplexer 252a outputs the value of "0" as the determination result. In other words, it is determined that the packet which is transmitted from the node ND at the address (1, 0) to the node ND at the address (2, 1) does not pass through the path in which the lane degeneration occurred. In this case, the gap control unit 74 does not instruct the insertion unit 72 to insert the gap GAP between the packets.

As above, similar to the embodiment illustrates in FIG. 1, it is possible to suppress the occurrence of the congestion causing the decrease in the transmission rate in the embodiments illustrated in FIG. 2 to FIG. 22. In addition, embodiments illustrated in FIG. 2 to FIG. 22, it is possible to suppress the buffer unit BUF, of the switch device SW through which the packet passes, from being clogged. For this reason, it is possible to suppress occurrence of the congestion in paths other than the path the degeneration occurred in a chain reaction.

The degeneration notification packet is sequentially transmitted to the switch device SW which is connected to the node ND from which the packet is transmitted. For this reason, the node ND from which the packet is transmitted can insert the gap GAP from the transmission of the next packet, thereby suppressing the occurrence of the congestion in the network.

The degeneration notification packet is transmitted to the transmission source switch device SW for each transmission of the packet. Then, the switch device SW which is present in the path to the transmission source switch device SW holds the degeneration information FB included in the degeneration notification packet. At this time, in a case where the switch device SW which is present in the path between the address of the notification destination and the address of the degeneration position already received the degeneration information FB by the control table 30a illustrated in FIG. 5, it is possible to avoid repeatedly transmitting the degeneration information FB. As a result, it is possible to suppress an increase in a load on the network, thereby holding the degeneration information FB in the switch device SW.

Figure 23:
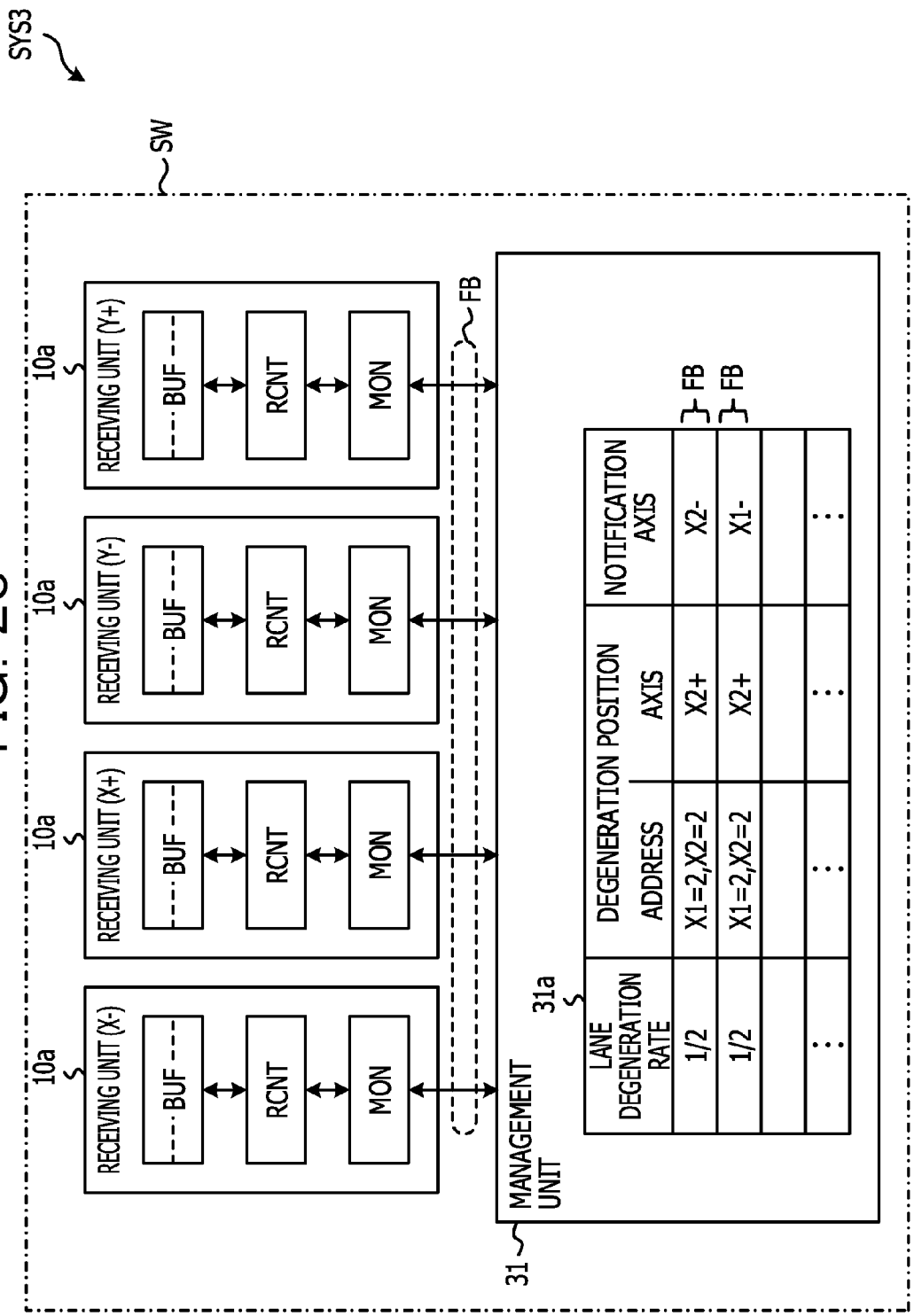
FIG. 23 is a diagram illustrating an example of a management unit provided in a switch device in an information processing system of another embodiment.

FIG. 23 illustrates an example of a management unit 31 provided in a switch device in an information processing system of another embodiment. The management unit 31 is provided instead of the management unit 30 as illustrated in FIG. 5 and includes the management table 31a instead of the management table 30a. The switch device SW has the same configuration as that in FIG. 5 except for including the management table 31a. The switch device SW is configured in the same way as in FIG. 3 except for a different operation of the monitoring unit MON and the management unit 31. In other words, similar to the information processing system SYS2 illustrated in FIG. 2, an information processing system SYS3 is configured to have a two-dimensional network in a mesh type in which a plurality of nodes ND are connected to each other via a switch device SW and operates as a parallel computer. The information processing system SYS3 employs a dimension order routine which determines the transmission path of the packet in the direction of the address being increased in order of the axis X1 and the axis X2, and determines the transmission path of the packet in the direction of the address being decreased in order of the axis X2 and the axis X1. The dimensionality of network, the topology (mesh, torus, or the like) and the number of the node ND are not limited to the number as illustrated in FIG. 2. FIG. 23 to FIG. 29 illustrates another embodiment of an information processing system, an information processing apparatus, a switch device and a control method of the information processing system.

The management table 31a has an area of a "notification axis" instead of the area of the "notification destination address" of the management table 30a as illustrated in FIG. 5. The "notification axis" indicates a direction of the axis from which the degeneration notification packet is transmitted. In the embodiments illustrated in FIG. 23 to FIG. 29, the degeneration notification packet is transmitted to the switch device SW at an end of the axis along with the axial direction within the area of the "the notification axis" in the management table 31a. In a case of a torus-type network, the degeneration notification packet is transmitted to the switch device SW transmitting the degeneration notification packet along with the axial direction within the area of the "notification axis" in the management table 31a. In other words, in the torus-type network, the switch device SW transmitting the degeneration notification packet becomes the switch device SW at the end of the axis.

Figure 24:
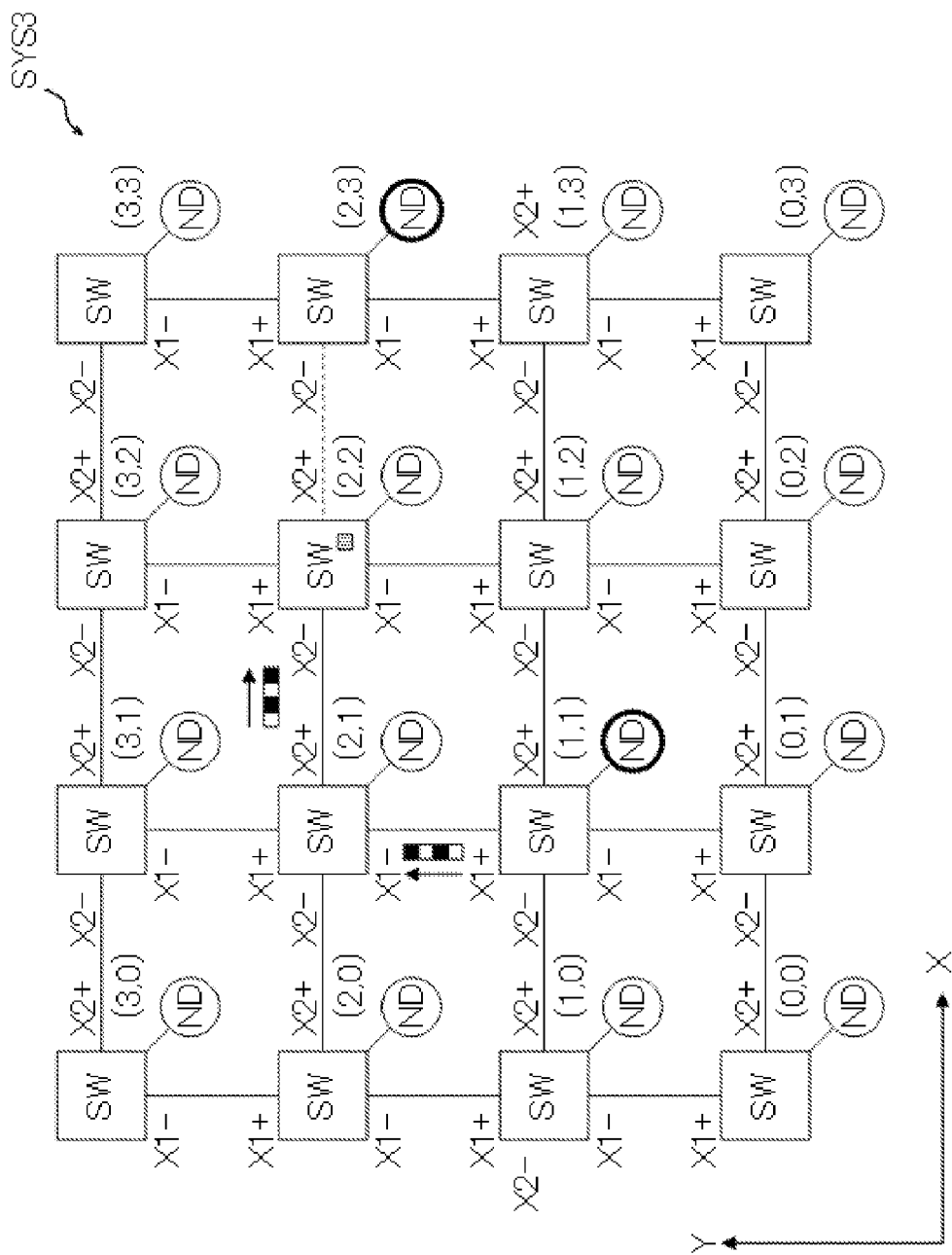
FIG. 24 is a diagram illustrating an example of transmission of a packet in the information processing system as illustrated in FIG. 23.

FIG. 24 illustrates an example of transmission of a packet in the information processing system SYS3 as illustrated in FIG. 23. Regarding the same as or similar to the operation illustrated in FIG. 6, the same marks or signs as those of the operation illustrated in FIG. 6 are denoted, and the specific description will not be repeated. In the same way as in FIG. 6, in the example in FIG. 24, the lane degeneration having a half of lane degeneration rate currently occurs in the path of the switch device SW at the address (2, 2) in the + direction of the axis X2. The path in which the lane degeneration occurred is indicated by the broken line.

In the example in FIG. 24, the node ND at the address (1, 1) indicated by a thick circle transmits the packet to the node ND at the address (2, 3) as a destination. In accordance with the rule of the dimension order routine, the packet is sequentially transmitted to the switch devices SW at addresses (2, 1) and (2, 2). The switch device SW at the address (2, 2) detects that the destination information included in the packet based on the packet passes through the path in which the lane degeneration occurred in the "+" direction of the axis X2, and stores the degeneration information FB in the management table 30a. At this time, the switch device SW stores "X2−" indicating "−" direction of the axis X2, which receives the packet in the area of the "notification axis" in the management table 31a. The degeneration information FB stored in the management table 31a is indicated in the first line of the management table 30a in FIG. 23.

Figure 25:
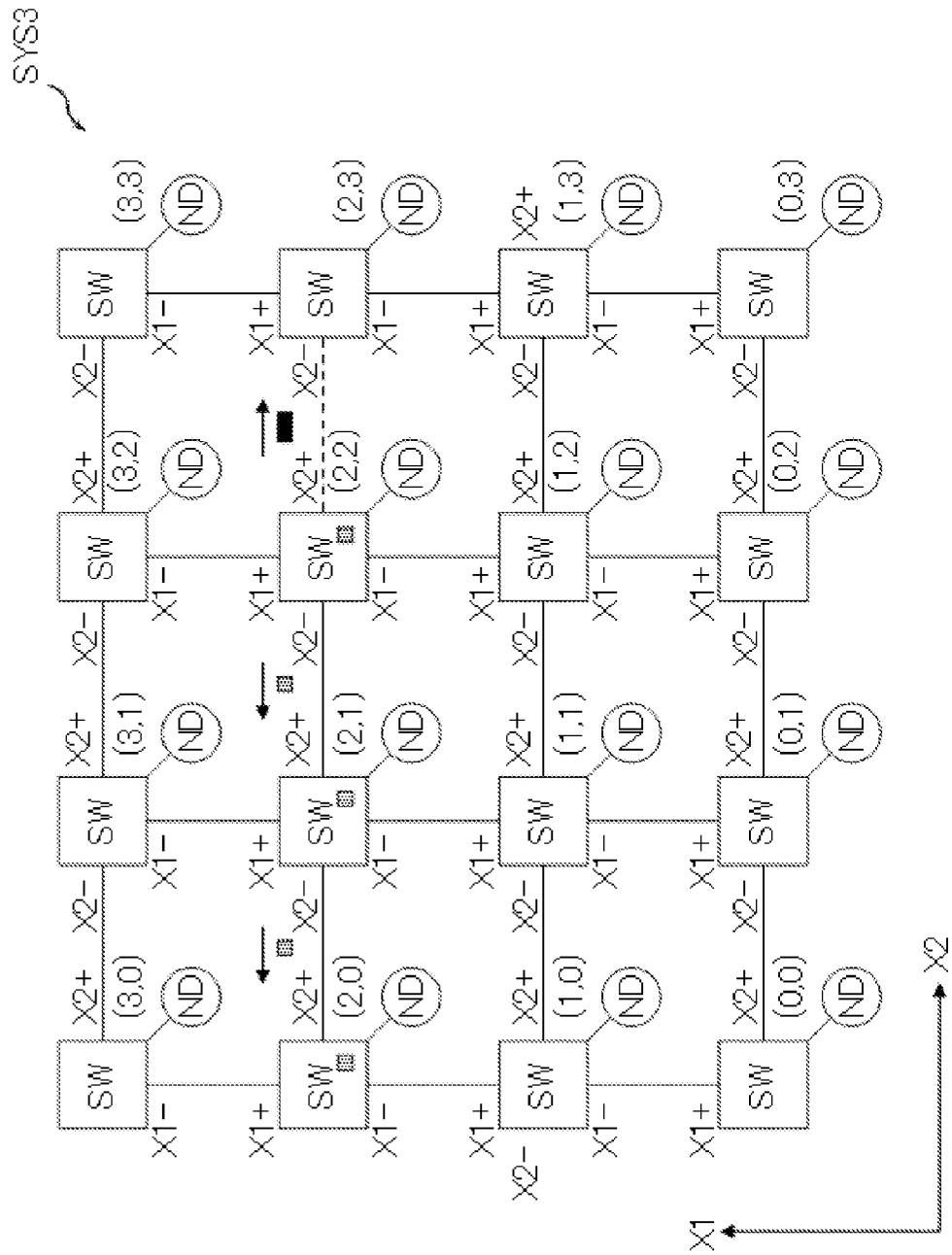
FIG. 25 is a diagram illustrating an example in which a degeneration notification packet is transmitted to a switch device in the information processing system as illustrated in FIG. 23.

FIG. 25 illustrates an example of that a degeneration notification packet is transmitted to a switch device SW in the information processing system SYS3 as illustrated in FIG. 23. Regarding the same as or similar to the operation illustrated in FIG. 7, the same marks or signs as those of the operation illustrated in FIG. 7 are denoted, and the specific description will not be repeated. FIG. 25 subsequently illustrates the operation illustrated in FIG. 24. The address (2, 2) of the switch device SW connected to the lane in which the degeneration occurred transmits the degeneration notification packet including the degeneration information FB toward the switch device SW at the end (the address (2, 0)) in the "−" direction of the axis X2.

In the same way as in FIG. 7, the switch device SW at the address (2, 2) transmits the degeneration notification packet, and then transmits the packet transmitted from the node ND at the address (1, 1) to the path in which the lane is degenerated. Then, the packet transmitted from the node ND at the address (1, 0) is transmitted to the node ND at the address (2, 3) via the switch device SW of the address (2, 3).

The degeneration notification packet is sequentially transmitted to the switch devices SW at address (2, 1) and (2, 0). The switch device SW which receives the degeneration notification packet stores the degeneration information FB included in the degeneration notification packet in the management table 31a of the management unit 31. In addition, the corresponding switch device SW transmits the degeneration notification packet to the next the switch device SW. In FIG. 25, the degeneration information FB stored in the management table 31a is indicated by the netting square in the switch device SW. The switch device SW at the address (2, 2) may store the degeneration information FB in the management unit 31 at the time when the lane degeneration occurred in the path in the + direction of the axis X2.

Figure 26:
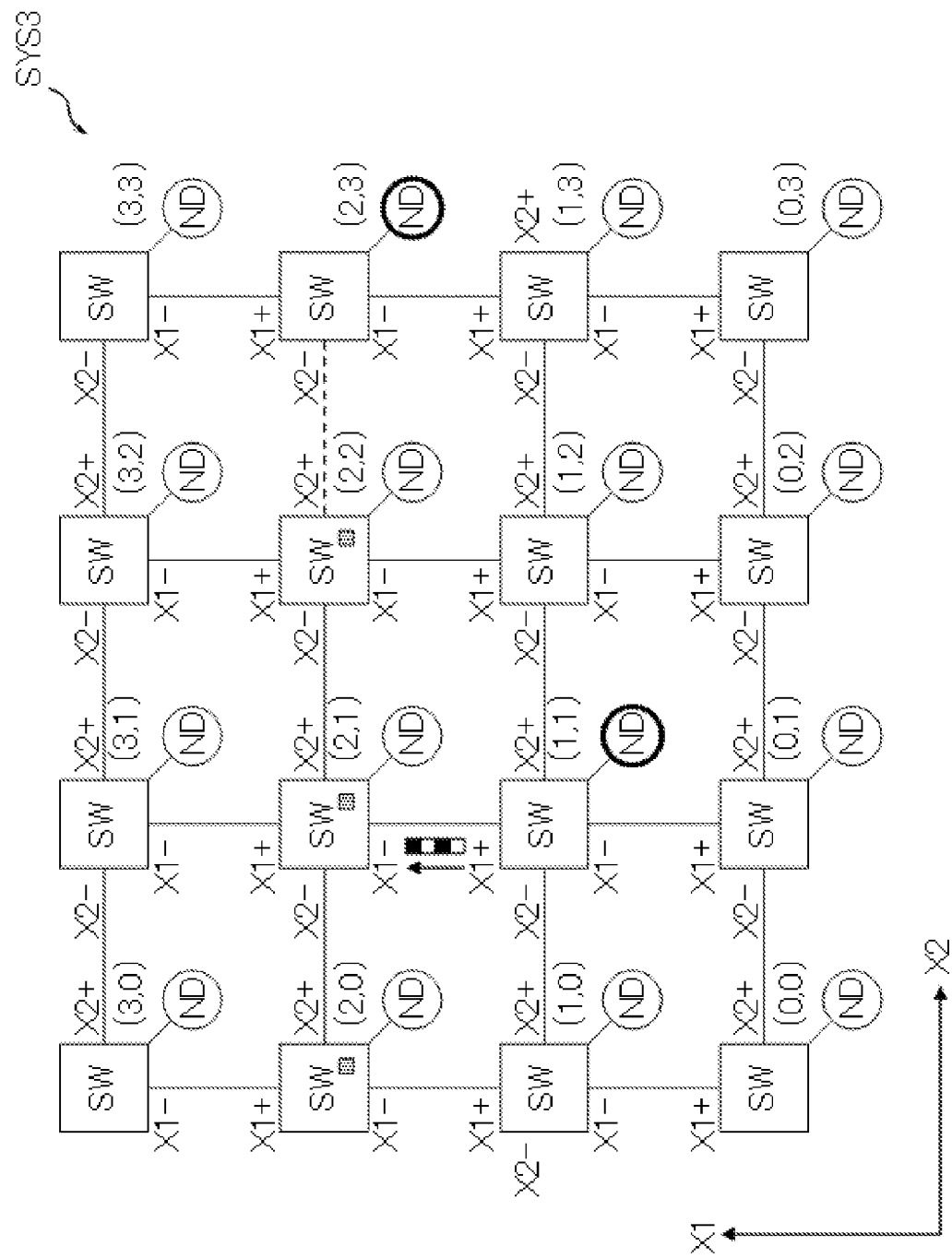
FIG. 26 is a diagram illustrating another example of the transmission of the packet in the information processing system as illustrated in FIG. 23.

FIG. 26 illustrates another example of the transmission of the packet in the information processing system SYS3 as illustrated in FIG. 23. Regarding the same as or similar to the operation illustrated in FIG. 10, the same marks or signs as those of the operation illustrated in FIG. 10 are denoted, and the specific description will not be repeated. FIG. 26 subsequently illustrates the operation illustrated in FIG. 25.

In the same way as in FIG. 10, in FIG. 26, the packet is transmitted to the node ND at the address (2, 3) from the node ND at the address (1, 1) indicated by the thick circle. The switch device SW at the address (1, 1) does not hold the degeneration information FB in the management table 31a. For this reason, the node ND at the address (1, 1) transmits the packet at the same transmission rate as that of the node ND at the address (1, 0) as illustrated in FIG. 24.

The switch device SW at the address (2, 1) which receives the packet from the switch device SW at the address (1, 1) refers to the management table 31a and detects that the packet passes through the path in which the lane degeneration occurred. Then, the switch device SW at the address (2, 1) updates the management table 31*a*. The switch device SW at the address (2, 1) adds the degeneration information FB of "the lane degeneration rate 1/2, the degeneration address X1=2, X2=2, the degeneration axis X2+, the notification axis X1−". The degeneration information FB which is added to the management table 31*a* is in the second line of the management table 31*a* in FIG. 23.

Figure 27:
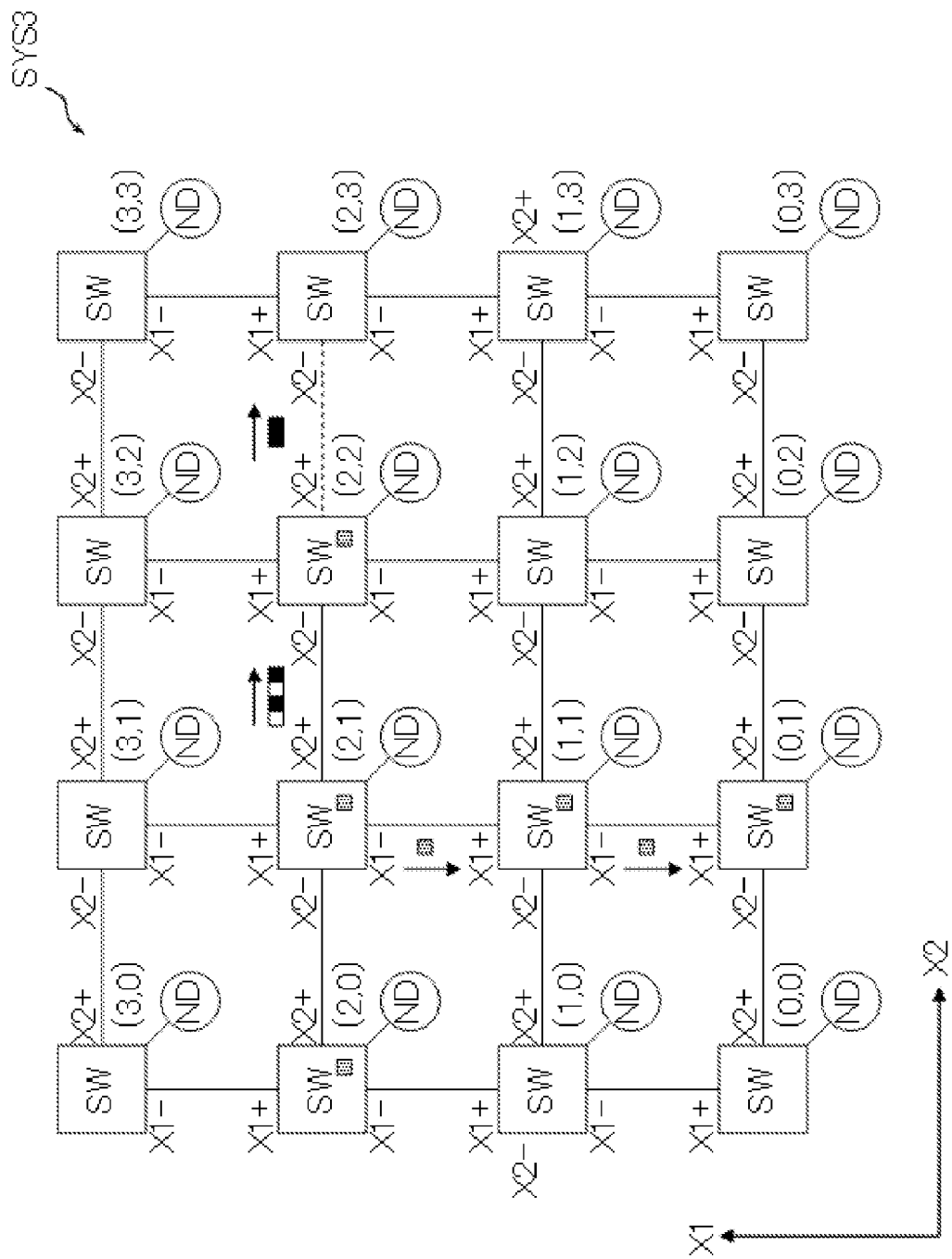
FIG. 27 is a diagram illustrating another example in which the degeneration notification packet is transmitted to the switch device in the information processing system as illustrated in FIG. 23.

FIG. 27 illustrates another example of that the degeneration notification packet is transmitted to the switch device SW in the information processing system SYS3 as illustrated in FIG. 23. Regarding the same as or similar to the operation illustrated in FIG. 25, the same marks or signs as those of the operation illustrated in FIG. 25 are denoted, and the specific description will not be repeated. FIG. 27 subsequently illustrates the operation illustrated in FIG. 26.

The switch device SW at the address (2, 1) which receives the packet from the switch device SW at the address (1, 1) transmits the degeneration notification packet including the degeneration information FB toward the switch device SW of the end (the address (0, 1)) which receives the packet in the "−" direction of the axis X1.

The switch device SW at the address (2, 1) transmits the degeneration notification packet, and then transmits the packet transmitted from the node ND at the address (1, 1) to the path in which the lane is degenerated. Then, the packet transmitted from the node ND at the address (1, 0) is transmitted to the node ND at the address (2, 3) via the switch device SW of the address (2, 3).

The degeneration notification packet is sequentially transmitted to the switch devices SW at address (1, 1) and (0, 1). The switch device SW which receives the degeneration notification packet stores the degeneration information FB included in the degeneration notification packet in the management table 31*a* of the management unit 31. In addition, the corresponding switch device SW transmits the degeneration notification packet to the next the switch device SW.

In FIG. 27, the degeneration notification packet is transmitted from the switch device SW which receives the packet before the switch device SW which is connected to the path in which the degeneration of the lane occurred receives the packet. For this reason, it is possible to rapidly transmit the degeneration notification packet to the switch device SW of the transmission source of the packet compared with the case in FIG. 11. The degeneration notification packet is transmitted to the switch device SW at the end of axis of, and thus as the network is large (as the number of the switch device SW disposed on the axis is great), it is possible to transmit the degeneration notification packet to the more switch devices SW.

FIG. 28 illustrates an example of operation the switch device in the switch device SW as illustrated in FIG. 23. Regarding the same as or similar to the operation illustrated in FIG. 12, the same marks or signs as those of the operation illustrated in FIG. 12 are denoted, and the specific description will not be repeated. In FIG. 28, S101*a* is inserted between S100 and S102 in FIG. 12, and S102*a*, S104*a*, and S108*a* are executed instead of S102, S104, and S108 in FIG. 12. Other processes are executed in the same way as in FIG. 12. The operation illustrated in FIG. 28 may be realized by the hardware in the port PT1 illustrated in FIG. 3 or may be realized by the program executed by the processor included in the port PT1.

First, in S100, when the receiving unit 10*a* receives the packet, in S101*a*, it is determined that the degeneration information FB is held in the management table 31 of the switch device SW which receives the packet. When the degeneration information FB is held in the management table 31*a* (Yes in S101*a*), the process proceeds to S102. On the other hand, when the degeneration information FB is not held in the management table 31*a* (No in S101*a*), the process proceeds to S110.

In S102*a*, in the same way in FIG. 12, the monitoring unit MON refers to the management table 31*a* determines whether the received packet passes through the path, connected to the switch device SW, in which the lane is degenerated. Here, S102 is executed by all of the switch devices SW which hold the degeneration information FB and include the switch device SW connected to the path in which the lane degeneration occurred. For example, the monitoring unit MON confirms whether the received packet passes through the degeneration position included in the degeneration information FB which is held in the management table 31*a*. A method of determining whether the received packet passes through the path in which the lane is degenerated will be described at the end of the description of FIG. 28.

When the packet passes through the path, connected to the switch device SW, in which the lane is degenerated (Yes in S102*a*), the process proceeds to S104*a*. On the other hand, when the packet passes through the path, connected to the switch device SW, in which the lane is degenerated (No in S102*a*), the process proceeds to S110.

In S104, the monitoring unit MON determines whether the notification of the degeneration notification packet is not performed in the direction of the axis in which the packet is received. For example, when the axis of the reception direction of the packet passing through the degeneration position, which is included in the degeneration information FB is different from the "notification axis" which is included in the degeneration information FB, the monitoring unit MON determines that notification of the degeneration notification packet is not performed. On the other hand, when the axis of the reception direction of the packet passing through the degeneration position, which is included in the degeneration information FB is the same as the "notification axis" which is included in the degeneration information FB, the monitoring unit MON determines that notification of the degeneration notification packet is performed. When the degeneration notification packet is not performed (No in S104*a*), the process proceeds to S106. On the other hand, when the degeneration notification packet is performed (Yes in S104*a*), the process proceeds to S110.

In S106, similar to S106 in FIG. 12, the monitoring unit MON updates the management table 31*a*. At this moment, the direction of axis to which the degeneration notification packet is transmitted is stored as the "notification axis".

Next, in S108*a*, similar to S108 in FIG. 12, the transmission unit 20*a* transmits the degeneration information FB read out from the management table 31*a* toward the switch device SW at the end of the "notification axis" as the degeneration notification packet.

Next, in S110, similar to S110 in FIG. 12, the transmission unit 20*a* which is positioned in the transmission direction of the packet transmits the packet from the control unit RCNTa toward the node ND which is indicated by the destination information included in the packet. After the end of the process in S110, the process returns to S100 again.

In the operation as illustrated in FIG. 28, S104*a*, S106, and S108*a* hold the degeneration information FB and are executed by the switch device SW which receives the packet. As illustrated in FIG. 25 and FIG. 27, another switch device SW which receives the degeneration notification packet transmits the degeneration notification packet to the adjacent switch device SW.

Next, a determining method of S102a is illustrated, that is, the condition of determining whether the received packet passes through the path in which the lane is degenerated. The network topology is the n-dimensional network in the mesh type or the n-dimensional network in the torus type.

It is determined that the packet passes through the path in which the lane degeneration occurred if the axis from which the packet is transmitted is equivalent to the axis in which the lane is degenerated, and any one of the above described conditions of (condition 4), (condition 5), (condition 6), and (condition 7) is satisfied. In this case, the switch device SW which receives the packet transmits the degeneration notification packet to the axis to which the packet is transmitted. It is possible to determine whether the packet passes through the path in which the lane degeneration occurred by the same as or similar to a circuit of the second determination unit JDG4n illustrated in FIG. 20.

FIG. 29 illustrates an example of content of the management table 31a in the switch device SW in a state as illustrated in FIG. 27. The switch device SW at the address (2, 2) transmits the degeneration notification packet in a state of FIG. 25, and does not receive the degeneration notification packet from another switch device SW, and thus holds one degeneration information FB. The switch device SW at the address (2, 1) receives the degeneration notification packet in the state in FIG. 25, in order to transmit the degeneration notification packet in a state in FIG. 27, two degeneration information items FB are held.

The switch device SW at the address (2, 0) receives the degeneration notification packet in the state in FIG. 25 and thus holds one degeneration information FB. Similarly, the switch devices SW at the address (1, 1) and address (0, 1) receive the degeneration notification packet in the state in FIG. 27, the one degeneration information FB and thus holds one degeneration information FB.

As above, in the embodiments as illustrated in FIG. 23 to FIG. 29, similar to the embodiments as illustrated in FIG. 1 to FIG. 22, it is possible to suppress occurrence of the congestion which causes the decrease in the transmission rate. Since it is possible to suppress the buffer unit BUF of the switch device SW, through which the packet passes from being clogged. For this reason, it is possible to suppress occurrence of the congestion in paths other than the path the degeneration occurred in a chain reaction.

Further, in the embodiments as illustrated in FIG. 23 to FIG. 29, the degeneration notification packet is transmitted from the switch device SW which receives the packet before the switch device SW which is connected to the path in which the degeneration of the lane occurred receives the packet. For this reason, it is possible to rapidly transmit the degeneration notification packet to the switch device SW of the transmission source of the packet compared with the case in FIG. 11. The degeneration notification packet is transmitted to the switch device SW at the end of axis, and thus as the network is large (as the number of the switch device SW disposed on the axis is great), it is possible to transmit the degeneration notification packet to the more switch devices SW. As a result, it is possible to reduce the occurrence of the congestion in the network.

In a case where the switch device SW which is present in the path extending from the notification destination toward the notification axis already received the degeneration information FB by the control table 31a illustrated in FIG. 23, it is possible to avoid repeatedly transmitting the degeneration information FB. As a result, it is possible to suppress an increase in a load on the network, thereby holding the degeneration information FB in the switch device SW.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control method by an information processing system including a computer, a first switch device, and a second switch device, the first switch device being coupled to a path and the second switch device being coupled to the computer, the control method comprising:
   detecting, by the first switch device, a decrease of a transmission rate of the path, the decrease of the transmission rate being caused by a decrease of output capacity from the first switch device to the path;
   transmitting, from the first switch device to the second switch device, degeneration information designating the path and the transmission rate of the path, the degeneration information including a decreasing ratio of the transmission rate, a degeneration position, which is a position of the path in which the transmission rate is decreased, and a notification address, which is an address of the first switch device that notifies the degeneration position;
   storing, in the second switch device, the degeneration information;
   determining, by the computer, whether a plurality of packets are to pass through the path in which the transmission rate is decreased, based on the degeneration information stored in the second switch device before the plurality of packets are transmitted from the computer;
   determining, by the computer, a length of a gap based on the transmission rate of the path when it is determined that the plurality of packets are to pass through the path;
   transmitting, by the computer, the plurality of packets with a transmission interval determined based on the determined length of the gap;
   determining whether the degeneration information is transmitted to the second switch device by the first switch device when the received packet is determined to pass through the degeneration position included in the degeneration information;
   determining that the degeneration information is not transmitted to the second switch device when the address of the computer that is a transmission source of the received packet indicates a path other than the path between the notification address and the degeneration position included in the degeneration information;
   storing new degeneration information, which includes an address of a transmission destination of the degeneration information, the decreasing ratio in the transmission rate, and the degeneration position in a second memory included in the second switch device; and transmitting the new degeneration information to the computer that is the transmission source based on the address of the computer which is the transmission source.

2. The control method according to claim 1, further comprising:
transmitting the degeneration information which is stored in a first memory included in the first switch device toward the second switch device; and
storing the degeneration information in the second memory included in the second switch device,
wherein the determining includes determining based on the degeneration information which is stored in the second memory when the plurality of packets are to be transmitted from the computer.

3. The control method according to claim 2, further comprising
receiving, by the first switch device, the packet which is transmitted to the firstly detected path after a decrease in the transmission rate occurs in the detected path.

4. The control method according to claim 2, wherein the transmitting of the degeneration information includes:
storing the degeneration information in the first memory when the first switch device receives the packet passing through the path in which the transmission rate is decreased; and
transmitting the degeneration information toward the second switch device which is disposed at an end of the path through which the packet passes.

5. The control method according to claim 1,
wherein the degeneration information includes a notification axis indicating a direction which notifies the degeneration position.

6. The control method according to claim 5, further comprising:
determining that the degeneration information is not transmitted to a direction of the notification axis when an axis in the reception direction of the received packet is different from the notification axis included in the degeneration information;
storing new degeneration information, which includes the address of the transmission destination of the degeneration information, the decreasing ratio in the transmission rate, and the degeneration position in a first memory included in the first switch device; and
transmitting the new degeneration information to the computer which is the transmission source based on the address of the computer which is the transmission source.

7. The control method according to claim 1,
wherein the transmitting of the plurality of packets includes inserting the gap having the length obtained by multiplying an interval of the respective plurality of packets by a reciprocal of the decreasing ratio between the respective plurality of packets when the transmission rate is not decreased.

8. The control method according to claim 1, wherein
the path includes a plurality of lanes, and
the decrease of the output capacity is caused when at least one lane of the plurality of lanes stops working.

9. An information processing system, comprising:
a computer;
a first switch device coupled to a path; and
a second switch device coupled to the computer,
wherein the first switch device includes:
a first memory; and
a first processor coupled to the first memory and configured to:
detect a decrease of transmission rate of the path, the decrease of the transmission rate being caused by a decrease of output capacity from the first switch device to the path, and
transmit, to the second switch device, degeneration information designating the path and the transmission rate of the path, the degeneration information including a decreasing ratio of the transmission rate, a degeneration position, which is a position of the path in which the transmission rate is decreased, and a notification address, which is an address of the first switch device that notifies the degeneration position,
wherein the second switch device includes:
a second memory; and
a second processor coupled to the second memory and configured to:
store the degeneration information in the second memory,
wherein the computer includes:
a third memory; and
a third processor coupled to the third memory and configured to:
determine whether a plurality of packets are to pass through the path in which the transmission rate is decreased, based on the degeneration information stored in the second switch device, before transmitting the plurality of packets;
determine a length of a gap based on the transmission rate of the path when it is determined that the plurality of packets are to pass through the path; and
transmit the plurality of packets with a transmission interval determined based on the determined length of the gap, and
wherein the first processor is further configured to:
determine whether the degeneration information is transmitted to the second switch device when the received packet is determined to pass through the degeneration position included in the degeneration information;
determine that the degeneration information is not transmitted to the second switch device when the address of the computer which is a transmission source of the received packet indicates a path other than the path between the notification address and the degeneration position included in the degeneration information;
store new degeneration information which includes an address of a transmission destination of the degeneration information, the decreasing ratio in the transmission rate, and the degeneration position in the first memory; and
transmit the new degeneration information to the computer which is the transmission source based on the address of the computer which is the transmission source.

10. The information processing system according to claim 9, wherein the degeneration information includes a notification axis indicating a direction which notifies the degeneration position.

11. The information processing system according to claim 9, wherein
the path includes a plurality of lanes, and
the decrease of the output capacity is caused when at least one lane of the plurality of lanes stops working.

12. An information processing apparatus configured to be coupled to a first switch device, the first switch device being coupled to a second switch device, and the second switch device being coupled to a path, the information processing apparatus comprising:
a memory; and
a processor coupled to the memory and configured to:
determine whether a plurality of packets are to pass through the path in which a transmission rate is decreased based on degeneration information indicating a decrease of the transmission rate of the path before transmitting the plurality of packets, the decrease of the transmission rate being caused by a decrease of output capacity from the first switch device to the path, the degeneration information being obtained by the second switch device and being transmitted from the second switch device to the first switch device being stored in the first switch device, the degeneration information being transmitted from the first switch device, the degeneration information including a degeneration position, which is a position of the path in which the transmission rate is decreased, and a notification address, which is an address of the first switch device that notifies the degeneration position,
determine the length of a gap based on the transmission rate of the path when it is determined that the plurality of packets are to pass through the path, and
transmit the plurality of packets with a transmission interval determined based on the determined length of the gap,
wherein the second switch device is configured to:
determine whether the degeneration information is transmitted to the first switch device when the received packet is determined to pass through the degeneration position included in the degeneration information,
determine that the degeneration information is not transmitted to the first switch device when the address of a computer which is a transmission source of the received packet indicates a path other than the path between the notification address and the degeneration position included in the degeneration information,
store new degeneration information which includes an address of a transmission destination of the degeneration information, the decreasing ratio in the transmission rate, and the degeneration position, and
transmit the new degeneration information to the computer which is the transmission source based on the address of the computer which is the transmission source.

13. The information processing apparatus according to claim 12, wherein
the path includes a plurality of lanes, and
the decrease of the output capacity is caused when at least one lane of the plurality of lanes stops working.

14. A control method by an information processing system including a computer, a first switch device, and a second switch device, the first switch device being coupled to a path and the second switch device being coupled to the computer, the control method comprising:
detecting, by the first switch device, a decrease of a transmission rate of the path, the decrease of the transmission rate being caused by a decrease of output capacity from the first switch device to the path;
transmitting, from the first switch device to the second switch device, degeneration information designating the path and the transmission rate of the path, the degeneration information including a degeneration position, which is a position of the path in which the transmission rate is decreased, and a notification axis indicating a direction which notifies the degeneration position;
storing, in the second switch device, the degeneration information;
determining, by the computer, whether a plurality of packets are to pass through the path in which the transmission rate is decreased, based on the degeneration information stored in the second switch device before the plurality of packets are transmitted from the computer;
determining, by the computer, a length of a gap based on the transmission rate of the path when it is determined that the plurality of packets are to pass through the path;
transmitting, by the computer, the plurality of packets with a transmission interval determined based on the determined length of the gap;
determining whether the degeneration information is transmitted to the second switch device by the first switch device when the received packet is determined to pass through the degeneration position included in the degeneration information;
determining that the degeneration information is not transmitted to a direction of the notification axis when an axis in the reception direction of the received packet is different from the notification axis included in the degeneration information;
storing new degeneration information, which includes the address of the transmission destination of the degeneration information, the decreasing ratio in the transmission rate, and the degeneration position in a first memory included in the first switch device; and
transmitting the new degeneration information to the computer which is the transmission source based on the address of the computer which is the transmission source.

* * * * *